US011575980B2

(12) United States Patent
Hwang et al.

(10) Patent No.: US 11,575,980 B2
(45) Date of Patent: Feb. 7, 2023

(54) ELECTRONIC APPARATUS AND CONTROLLING METHOD THEREOF

(71) Applicant: Samsung Electronics Co., Ltd., Suwon-si (KR)

(72) Inventors: Taehwan Hwang, Suwon-si (KR); Daedong Kim, Suwon-si (KR); Jisoo Yeh, Suwon-si (KR); Jihyouk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/951,135

(22) Filed: Nov. 18, 2020

(65) Prior Publication Data

US 2021/0160594 A1 May 27, 2021

(30) Foreign Application Priority Data

Nov. 22, 2019 (KR) ........................ 10-2019-0150979

(51) Int. Cl.
*H04Q 9/00* (2006.01)
*H04W 4/80* (2018.01)

(52) U.S. Cl.
CPC ................ *H04Q 9/00* (2013.01); *H04W 4/80* (2018.02); *H04Q 2209/43* (2013.01)

(58) Field of Classification Search
CPC ........ H04Q 9/00; H04Q 2209/43; H04Q 9/04; H04W 4/80; H04W 76/15; F24F 11/87; F24F 11/56; F24F 11/64; F24F 11/52; F24F 11/30; F24F 2110/10; G08C 2201/20; G08C 2201/30; G08C 19/28; G08C 17/02
USPC ........................................................ 455/41.2
See application file for complete search history.

(56) References Cited

U.S. PATENT DOCUMENTS

| | | | | |
|---|---|---|---|---|
| 9,949,344 | B1 * | 4/2018 | Sanchez | H05B 47/12 |
| 9,979,625 | B2 | 5/2018 | McLaughlin et al. | |
| 2013/0259230 | A1 | 10/2013 | Polo et al. | |
| 2015/0271432 | A1 * | 9/2015 | Muth | H04W 4/80 348/552 |
| 2020/0215961 | A1 * | 7/2020 | Alataas | A42B 3/044 |

FOREIGN PATENT DOCUMENTS

| | | | |
|---|---|---|---|
| JP | 2019-103001 | A | 6/2019 |
| KR | 10-2013-0111165 | A | 10/2013 |
| KR | 10-1706138 | B1 | 2/2017 |
| KR | 10-1874515 | B1 | 7/2018 |

* cited by examiner

*Primary Examiner* — Eugene Yun
(74) *Attorney, Agent, or Firm* — Jefferson IP Law, LLP

(57) ABSTRACT

An electronic apparatus is provided. The electronic apparatus includes a memory storing complex command information including a plurality of functions and the order information of the plurality of functions, a communication interface, and a processor configured to control the communication interface to perform Bluetooth communication with a remote control apparatus, and based on a control signal being received from the remote control apparatus, acquire a plurality of function informations included in the control signal, and based on identifying that the plurality of function informations correspond to the plurality of functions included in the complex command information, perform control operations corresponding to the plurality of function informations continuously based on the order information included in the complex command information.

14 Claims, 24 Drawing Sheets

| | CODE INFORMATION FOR EACH FUNCTION | | | | |
|---|---|---|---|---|---|
| | FUNCTION | ID | length | value | remarks |
| 1301 | TRANSMITTING IDENTIFICATION INFORMATION | 30 | 01 00 | XX | |
| 1302 | POWER ON | 00 | 02 00 | 00 0A | |
| 1303 | POWER OFF | 01 | 02 00 | 00 0B | |
| 1304 | TEMPERATURE UP | 02 | 02 00 | 00 0C | |
| 1305 | TEMPERATURE DOWN | 03 | 02 00 | 00 0D | |
| 1306 | REQUESTING THE CURRENT TEMPERATURE | 04 | 01 00 | 0E | |
| 1307 | REQUESTING THE SET TEMPERATURE | 05 | 01 00 | 0F | |

1310

| | COMPLEX COMMAND INFORMATION | | | | |
|---|---|---|---|---|---|
| | FUNCTION | ID | length | value | remarks |
| 1311 | TRANSMITTING IDENTIFICATION INFORMATION + POWER ON | 30 | 01 00 | XX | |
| | | 00 | 02 00 | 00 0A | |
| 1312 | TRANSMITTING IDENTIFICATION INFORMATION + POWER OFF | 30 | 01 00 | XX | |
| | | 01 | 02 00 | 00 0B | |
| 1315 | TRANSMITTING IDENTIFICATION INFORMATION + REQUESTING THE CURRENT TEMPERATURE + REQUESTING THE SET TEMPERATURE | 30 | 01 00 | XX | |
| | | 04 | 01 00 | 0E | |
| | | 05 | 01 00 | 0F | |

| | CODE INFORMATION FOR EACH FUNCTION | | | | |
|---|---|---|---|---|---|
| | FUNCTION | ID | length | value | remarks |
| 1301 | TRANSMITTING IDENTIFICATION INFORMATION | 30 | 01 00 | XX | |
| 1302 | POWER ON | 00 | 02 00 | 00 0A | |
| 1303 | POWER OFF | 01 | 02 00 | 00 0B | |
| 1304 | TEMPERATURE UP | 02 | 02 00 | 00 0C | |
| 1305 | TEMPERATURE DOWN | 03 | 02 00 | 00 0D | |
| 1306 | REQUESTING THE CURRENT TEMPERATURE | 04 | 01 00 | 0E | |
| 1307 | REQUESTING THE SET TEMPERATURE | 05 | 01 00 | 0F | |

⇕

1410

| | COMPLEX COMMAND INFORMATION | | | | |
|---|---|---|---|---|---|
| | FUNCTION | ID | length | value | remarks |
| 1411 | TRANSMITTING IDENTIFICATION INFORMATION + POWER ON | 30 00 | 03 00 | XX 00 0A | |
| 1412 | TRANSMITTING IDENTIFICATION INFORMATION + POWER OFF | 30 01 | 03 00 | XX 00 0B | |
| 1415 | TRANSMITTING IDENTIFICATION INFORMATION + REQUESTING THE CURRENT TEMPERATURE + REQUESTING THE SET TEMPERATURE | 30 04 05 | 03 00 | XX 0E 0F | |

| | CODE INFORMATION FOR EACH FUNCTION | | | | |
|---|---|---|---|---|---|
| | FUNCTION | ID | length | value | remarks |
| 1301 | TRANSMITTING IDENTIFICATION INFORMATION | 30 | 01 00 | XX | |
| 1302 | POWER ON | 00 | 02 00 | 00 0A | |
| 1303 | POWER OFF | 01 | 02 00 | 00 0B | |
| 1304 | TEMPERATURE UP | 02 | 02 00 | 00 0C | |
| 1305 | TEMPERATURE DOWN | 03 | 02 00 | 00 0D | |
| 1306 | REQUESTING THE CURRENT TEMPERATURE | 04 | 01 00 | 0E | |
| 1307 | REQUESTING THE SET TEMPERATURE | 05 | 01 00 | 0F | |

1510

| | COMPLEX COMMAND INFORMATION | | | | |
|---|---|---|---|---|---|
| | FUNCTION | ID | length | value | remarks |
| 1511 | TRANSMITTING IDENTIFICATION INFORMATION + POWER ON | AA 01 | 03 00 | XX 1A 01 | |
| 1512 | TRANSMITTING IDENTIFICATION INFORMATION + POWER OFF | AA 02 | 03 00 | XX 1A 02 | |
| 1515 | TRANSMITTING IDENTIFICATION INFORMATION + REQUESTING THE CURRENT TEMPERATURE + REQUESTING THE SET TEMPERATURE | AA 03 | 03 00 | XX 1B 01 | |

| command | type | remarks |
|---|---|---|
| RETURNING THE CURRENT TEMPERATURE | FIRST TYPE | read operation |
| RETURNING THE CURRENT HUMIDITY | FIRST TYPE | read operation |
| RETURNING THE SET TEMPERATURE | FIRST TYPE | read operation |
| RETURNING THE SET MODE | FIRST TYPE | read operation |
| COOLING MODE | SECOND TYPE | write operation |
| DEHUMIDIFICATION MODE | SECOND TYPE | write operation |
| TEMPERATURE DOWN | SECOND TYPE | write operation |
| TEMPERATURE UP | SECOND TYPE | write operation |

2110

2115

ELECTRONIC APPARATUS AND CONTROLLING METHOD THEREOF

CROSS-REFERENCE TO RELATED APPLICATION(S)

This application is based on and claims priority under 35 U.S.C. § 119(a) of a Korean patent application number 10-2019-0150979, filed on Nov. 22, 2019, in the Korean Intellectual Property Office, the disclosure of which is incorporated by reference herein in its entirety.

BACKGROUND

1. Field

The disclosure relates to an electronic apparatus and a controlling method thereof. More particularly, the disclosure relates to an electronic apparatus that receives complex control signals and performs a plurality of control operations, and a controlling method thereof.

2. Description of Related Art

An apparatus that can perform communicative connection between apparatuses through Bluetooth communication, and that receives a central apparatus control signal from an apparatus transmitting a control signal and performs a control operation can be referred to as an ambient apparatus.

Currently, one ambient apparatus and a plurality of central apparatuses can be connected based on various communication methods. In this case, signal interference among a plurality of central apparatuses may occur. For example, in case a first central apparatus and a second central apparatus are connected with an ambient apparatus, both of the first central apparatus and the second central apparatus may transmit a control signal to the ambient apparatus. Here, in case control signals are simultaneously received from different central apparatuses, it would be difficult for the ambient apparatus to figure out from which central apparatuses the received signals are received.

Here, in the case of using a signal packet additionally including identification information of a central apparatus, the signal packet of the existing ambient apparatus may be corrected or a new data format may be used. However, if correction of a signal packet or a new data format is used, there may be a problem that a signaling method between a central apparatus and an ambient apparatus becomes complex and compatibility becomes weak.

Meanwhile, index information indicating an operation number may be added to a signal transmitted from a central apparatus. For example, in case a central apparatus transmits two kinds of control signals, index information corresponding to a first signal may be information that the signal is the first signal among the two signals in total, and index information corresponding to a second signal may be information that the signal is the second signal among the two signals in total. However, in case control signals are simultaneously received from a plurality of central apparatuses when index information is added, the ambient apparatus should wait until all signals included in the index information arrive, and thus there may be a problem that the response time becomes longer.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus that performs a plurality of control operations based on complex control signals wherein at least two single control signals are grouped, and a controlling method thereof.

Another aspect of the disclosure is to provide an electronic apparatus for achieving the aforementioned purpose includes a memory storing complex command information including a plurality of functions and the order information of the plurality of functions, a communication interface, and a processor configured to control the communication interface to perform Bluetooth communication with a remote control apparatus, and based on a control signal being received from the remote control apparatus, acquire a plurality of function informations included in the control signal, and based on identifying that the plurality of function informations correspond to the plurality of functions included in the complex command information, perform control operations corresponding to the plurality of function informations continuously based on the order information included in the complex command information.

Additional aspects will be set forth in part in the description which follows and, in part, will be apparent from the description, or may be learned by practice of the presented embodiments.

Meanwhile, a controlling method of an electronic apparatus storing complex command information including a plurality of functions and the order information of the plurality of functions includes the operations of performing Bluetooth communication with a remote control apparatus, and based on a control signal being received from the remote control apparatus, acquiring a plurality of function informations included in the control signal, and based on identifying that the plurality of function informations correspond to the plurality of functions included in the complex command information, performing control operations corresponding to the plurality of function informations continuously based on the order information included in the complex command information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 13 is a diagram for illustrating complex command information according to an embodiment of the disclosure;

FIG. 14 is a diagram for illustrating complex command information according to an embodiment of the disclosure;

FIG. 15 is a diagram for illustrating complex command information according to an embodiment of the disclosure;

FIG. 21 is a diagram for illustrating types of a basic command according to an embodiment of the disclosure;

The same reference numerals are used to represent the same elements throughout the drawings.

DETAILED DESCRIPTION

Figure 1:
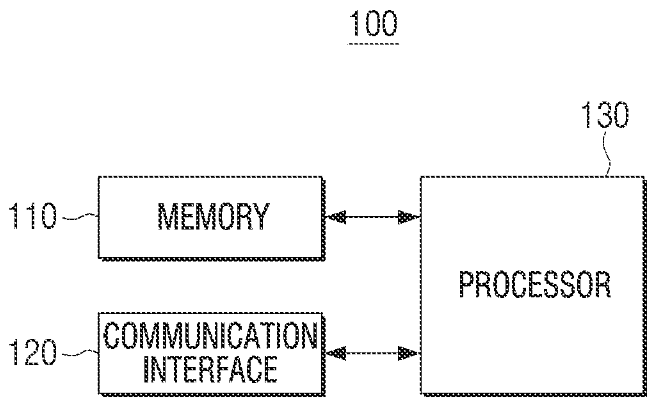
FIG. 1 is a block diagram illustrating an electronic apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

Terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this specification, expressions such as "have," "may have," "include," and "may include" should be construed as denoting that there are such characteristics (e.g.: elements such as numerical values, functions, operations, and components), and the expressions are not intended to exclude the existence of additional characteristics.

Also, the expression "at least one of A and/or B" should be interpreted to mean any one of "A" or "B" or "A and B."

In addition, the expressions "first," "second," and the like used in this specification may be used to describe various elements regardless of any order and/or degree of importance. Also, such expressions are used only to distinguish one element from another element, and are not intended to limit the elements.

Further, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

Meanwhile, singular expressions include plural expressions, as long as they do not obviously mean differently in the context. In addition, in the disclosure, terms such as "include" and "consist of" should be construed as designating that there are such characteristics, numbers, steps, operations, elements, components or a combination thereof described in the specification, but not as excluding in advance the existence or possibility of adding one or more of other characteristics, numbers, steps, operations, elements, components or a combination thereof.

Also, in the disclosure, "a module" or "a part" performs at least one function or operation, and may be implemented as hardware or software, or as a combination of hardware and software. Further, a plurality of "modules" or "parts"

may be integrated into at least one module and implemented as at least one processor (not shown), except "modules" or "parts" which need to be implemented as specific hardware.

In addition, in this specification, the term "user" may refer to a person who uses an electronic apparatus or an apparatus using an electronic apparatus (e.g.: an artificial intelligence electronic apparatus).

Hereinafter, an embodiment of the disclosure will be described in more detail with reference to the accompanying drawings.

FIG. 1 is a block diagram illustrating an electronic apparatus according to an embodiment of the disclosure.

Referring to FIG. 1, an electronic apparatus 100 may include a memory 110, a communication interface 120, and a processor 130.

An electronic apparatus according to the various embodiments of this specification may include, for example, at least one of an LED mask apparatus, a smartphone, a tablet PC, a mobile phone, a video phone, an e-book reader, a desktop PC, a laptop PC, a netbook computer, a workstation, a server, a PDA, a portable multimedia player (PMP), an MP3 player, a medical instrument, a camera, or a wearable device. Meanwhile, a wearable device may include at least one of an accessory-type device (e.g.: a watch, a ring, a bracelet, an ankle bracelet, a necklace, glasses, a contact lens, or a head-mounted-device (HMD)), a device integrated with fabrics or clothing (e.g.: electronic clothing), a body-attached device (e.g.: a skin pad or a tattoo), or an implantable circuit. Also, in some embodiments, an electronic apparatus may include at least one of, for example, a television, a digital video disk (DVD) player, an audio, a refrigerator, an air conditioner, a cleaner, an oven, a microwave oven, a washing machine, an air cleaner, a set top box, a home automation control panel, a security control panel, a media box (e.g.: Samsung HomeSync™, Apple TV™, or Google TV™), a game console (e.g.: Xbox™, PlayStation™), an electronic dictionary, an electronic key, a camcorder, or an electronic photo frame.

The memory 110 may be implemented as an internal memory such as a ROM (e.g., an electrically erasable programmable read-only memory (EEPROM)), a RAM, etc. included in the processor 130, or implemented as a separate memory from the processor 130. In this case, the memory 110 may be implemented in the form of a memory embedded in the electronic apparatus 100, or implemented in the form of a memory that can be attached to or detached from the electronic apparatus 100 according to the use of stored data. For example, in the case of data for driving the electronic apparatus 100, the data may be stored in a memory embedded in the electronic apparatus 100, and in the case of data for the extended function of the electronic apparatus 100, the data may be stored in a memory that can be attached to or detached from the electronic apparatus 100.

Meanwhile, in the case of a memory embedded in the electronic apparatus 100, the memory may be implemented as at least one of a volatile memory (e.g.: a dynamic RAM (DRAM), a static RAM (SRAM), or a synchronous dynamic RAM (SDRAM), etc.) or a non-volatile memory (e.g.: an one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). In the case of a memory that can be attached to or detached from the electronic apparatus 100, the memory may be implemented in a form such as a memory card (e.g., compact flash (CF), secure digital (SD), micro secure digital (Micro-SD), mini secure digital (Mini-SD), extreme digital (xD), a multi-media card (MMC), etc.) and an external memory that can be connected to a USB port (e.g., a USB memory), etc.

The communication interface 120 is a component performing communication with various types of external devices according to various types of communication methods. The communication interface 120 includes a Wi-Fi module, a Bluetooth module, an infrared communication module, a wireless communication module, etc. Here, each communication module may be implemented in the form of at least one hardware chip.

A Wi-Fi module and a Bluetooth module perform communication by a Wi-Fi method and a Bluetooth method, respectively. In the case of using a Wi-Fi module or a Bluetooth module, various types of connection information such as an SSID and a session key is transmitted and received first, and connection of communication is performed by using the information, and various types of information can be transmitted and received thereafter.

An infrared communication module performs communication according to an infrared Data Association (IrDA) technology of transmitting data to a near field wirelessly by using infrared rays between visible rays and millimeter waves.

A wireless communication module may include at least one communication chip that performs communication according to various wireless communication protocols such as Zigbee, 3rd Generation (3G), 3rd Generation Partnership Project (3GPP), Long Term Evolution (LTE), LTE Advanced (LTE-A), 4th Generation (4G), and 5th Generation (5G) other than the aforementioned communication methods.

In addition to the above, the communication interface 120 may include at least one of a local area network (LAN) module, an Ethernet module, or a wired communication module that performs communication by using a pair cable, a coaxial cable, or an optical fiber cable, etc.

According to an embodiment of the disclosure, the communication interface 120 may use the same communication module (e.g., a Wi-Fi module) for communicating with an external device such as a remote control and an external server.

According to another embodiment of the disclosure, the communication interface 120 may use different communication modules (e.g., a Wi-Fi module) for communicating with an external device such as a remote control and an external server. For example, the communication interface 120 may use at least one of an Ethernet module or a Wi-Fi module for communicating with an external server, or use a BT module for communicating with an external device such as a remote control. However, this is merely an example, and the communication interface 120 may use at least one communication module among various communication modules in the case of communicating with a plurality of external devices or external servers.

The processor 130 may perform overall control operations of the electronic apparatus 100. Specifically, the processor 130 performs a function of controlling the overall operations of the electronic apparatus 100.

The processor 130 may be implemented as a digital signal processor (DSP) processing digital signals, a microprocessor, and a time controller (TCON). However, the disclosure is not limited thereto, and the processor 130 may include one or more of a central processing unit (CPU), a micro controller unit (MCU), a micro processing unit (MPU), a controller, an application processor (AP), a graphics-processing unit (GPU) or a communication processor (CP), and an ARM processor, or may be defined by the terms. Also, the processor 130 may be implemented as a system on chip (SoC) having a processing algorithm stored therein or large scale integration (LSI), or in the form of a field programmable gate array (FPGA). Further, the processor 130 may perform various functions by executing computer executable instructions stored in the memory.

The processor 130 controls the overall operations of the electronic apparatus 100 by using various kinds of programs stored in the memory 110. Specifically, the processor 130 includes a RAM, a ROM, a main CPU, first to nth interfaces, and a bus 135. The RAM, the ROM, the main CPU, and the first to nth interfaces may be connected with one another through the bus 135. In the ROM, a set of instructions for system booting, etc. are stored. When a turn-on instruction is input and power is supplied, the main CPU copies the 0/S stored in the memory 110 in the RAM according to the instruction stored in the ROM, and boots the system by executing the 0/S. When booting is completed, the main CPU copies various kinds of application programs stored in the memory 110 in the RAM, and performs various kinds of operations by executing the application programs copied in the RAM. The main CPU accesses the memory 110, and performs booting by using the 0/S stored in the memory 110. Then, the main CPU performs various operations by using various kinds of programs, content data, etc. stored in the memory 110. The first to nth interfaces are connected with the aforementioned various kinds of components. One of the interfaces may be a network interface connected with an external device through a network.

The processor 130 may store control code information corresponding to a plurality of functions in the memory for performing a plurality of functions. In the control code information for performing a plurality of functions, one control code may be mapped to one function. Control code information corresponding to one function may fall under single command information (it will be described as a single command below). A single command may mean a command performing one function, and a complex command may mean a command performing a plurality of functions (at least two functions). Also, a single control signal may mean a control signal including only one single command, and a complex control signal may mean a control signal including a complex command.

The processor 130 may store complex command information including a plurality of functions and order information of the plurality of functions in the memory.

Complex command information may mean information that grouped a plurality of functions performed in the electronic apparatus 100. The electronic apparatus 100 may group at least two of the various functions performed in the electronic apparatus 100 as one command information. For example, the electronic apparatus 100 may group a first function and a second function and group them as one command information. Also, it may be defined in advance which function among the first function and the second function should be performed first, and information related to this may be included in order information. For example, order information may include the content that the first function should be performed first, and the second function should be performed next. Complex command information may include information that the first function and the second function among the plurality of functions are grouped as one command information. Also, complex command information may include order information indicating which function among the plurality of grouped functions should be performed first.

In addition, the processor 130 may control the communication interface 120 to perform Bluetooth communication with the remote control apparatus 200.

The processor 130 may communicate with the remote control apparatus 200 by performing Bluetooth communication. Here, Bluetooth communication may mean Bluetooth Low Energy (BLE) communication, and depending on embodiments, Bluetooth communication may use Bluetooth communication in different forms.

Also, the remote control apparatus 200 may mean at least one control apparatus. That is, the electronic apparatus 100 may communicate with one remote control apparatus, and depending on embodiments, the electronic apparatus 100 may be connected with a plurality of remote control apparatuses simultaneously.

Further, when a control signal is received from the remote control apparatus 200, the processor 130 may acquire a plurality of function informations included in the control signal, and the electronic apparatus 100 may include a processor 130 which, based on identifying that the plurality of function informations correspond to a plurality of functions included in the complex command information, continuously performs control operations corresponding to the plurality of function informations based on the order information included in the complex command information.

A control signal may be divided into a single control signal or a complex control signal as described above. When a control signal is received, the processor 130 may determine the type of the control signal (whether it is a single control signal or a complex control signal), and the processor 130 may perform different operations according to the type of the control signal. Detailed explanation in this regard will be made in FIG. 20 below.

For determining the type of a control signal, the processor 130 may analyze a plurality of function informations included in the control signal. Specifically, the processor 130 may acquire function information included in a control signal based on a control signal received from the remote control apparatus 200. Then, the processor 130 may determine whether the acquired function information is function information included in the complex command information.

Function information included in the complex command information may mean that a specific function is grouped with other functions. Accordingly, if specific function information is included in the complex command information, the specific function may be in a state of being grouped with other functions. Accordingly, the processor 130 may determine whether function information included in a control signal is one of a plurality of functions included in the complex command information. Here, if function information included in a control signal is one of a plurality of functions included in the complex command information, the processor 130 may determine that the control signal is a complex control signal. If the control signal is a complex control signal, the processor 130 may acquire a plurality of function informations included in the control signal based on the received control signal, and acquire order information corresponding to each of the plurality of function informations based on the complex command information. Then, the processor 130 may continuously perform a plurality of control operations corresponding to the plurality of function informations based on the plurality of function informations and the order information corresponding to each of the plurality of function informations.

For example, the plurality of function informations may include first code information corresponding to a first function executable in the electronic apparatus 100 and second code information corresponding to a second function executable in the electronic apparatus 100, and the processor 130 may continuously perform control operations corresponding to the first code information and the second code information based on the order information of the first function and the second function included in the complex command information.

The first code information and the second code information may be code information for a single command. However, the first function and the second function may be grouped in the complex command information. Accordingly, when the processor 130 acquires the first function information (the first code information) and the second function information (the second code information) in a received control signal, the processor 130 may continuously perform control operations corresponding to each function based on the order information of each function.

Meanwhile, the meaning of performing continuously may mean performing a plurality of identified operations (e.g., a first operation and a second operation) immediately without performing another operation (e.g., a third operation) between a plurality of operations (e.g., a first operation and a second operation). If a control signal for performing another operation (e.g., a third operation) is received while performing a plurality of identified operations (e.g., a first operation and a second operation), the processor 130 may wait without performing another operation (e.g., a third operation) while performing a plurality of identified operations (e.g., a first operation and a second operation).

Meanwhile, a plurality of functions included in the complex command information may include a plurality of functions of the same type, and the plurality of functions of the same type may be a plurality of functions performed by a read operation of data or a plurality of functions performed by a write operation of data.

In the plurality of functions, there may be types corresponding to each of the plurality of functions. For example, the first function may fall under a first type, and the second function may fall under a second type. A type may vary according to an attribute of a function or code information corresponding to a function. Meanwhile, a type may fall under predefined information. If the attribute of the first function (or the first code information corresponding to the first function) is related to a function of simply reading (or calling in) data, the first function may fall under a read operation type. Meanwhile, if the attribute of the second function (or code information corresponding to the second function) different from the first function is directly related to change of data or control of the electronic apparatus 100, the second function may fall under a write operation type.

According to an embodiment of the disclosure, a plurality of function informations included in a complex control signal may fall under the same type. For example, it will be assumed that the first function and the second function are included in a first complex control signal. Here, if the first function is a read operation type, the second function may also be a read operation type. In the complex command information, functions of the same type may be grouped for continuously performing operations of the same type. The control operation of the electronic apparatus 100 in case a plurality of functions included in a complex control signal are of the same type will be described in FIG. 22 below.

According to another embodiment of the disclosure, a plurality of function informations included in a complex control signal may fall under different types from one another. For example, it will be assumed that the first function and the second function are included in a first complex control signal. Here, the first function may be a read operation type and the second function may be a write operation type. The control operation of the electronic apparatus 100 in case a plurality of functions included in a complex control signal are different types will be described in FIG. 23 below.

Meanwhile, the remote control apparatus 200 may include a first remote control apparatus 201 and a second remote control apparatus 202, and if a first control signal received from the first remote control apparatus 201 corresponds to the first complex command information and a second control signal received from the second remote control apparatus 202 corresponds to the second complex command information, the processor 130 may continuously perform control operations corresponding to a plurality of function informations included in any one of the first control signal and the second control signal.

Meanwhile, it will be assumed that there are two remote control apparatuses 200 (a first remote control apparatus 201 and a second remote control apparatus 202) that can be connected with the electronic apparatus 100 through Bluetooth communication. Also, it will be assumed that a first control signal was received from the first remote control apparatus 201, and a second control signal was received from the second remote control apparatus 202 within a threshold time.

According to an embodiment of the disclosure, the processor 130 may process only one control signal among the first control signal and the second control signal. That is, the processor 130 may determine one control signal among the two control signals.

For example, in case both of the received first control signal and second control signal are complex control signals, the processor 130 may process one control signal among the first control signal and the second control signal. Here, the processor 130 may acquire a plurality of function informations included in the control signal (as a case wherein the first control signal and the second control signal are complex control signals was assumed, the selected control signal may also be a complex control signal), and the processor 130 may continuously perform control operations corresponding to the plurality of acquired function informations. Detailed explanation of a situation wherein a plurality of complex control signals are received will be made in FIG. 8 below.

According to another embodiment of the disclosure, the processor 130 may process both of the first control signal and the second control signal. That is, the processor 130 may process the first control signal and the second control signal in consideration of the first control signal, the second control signal, and the order information.

For example, if the received first control signal is a complex control signal, and the received second control signal is a single control signal, the processor 130 may perform all control operations corresponding to the first control signal and the second control signal.

The remote control apparatus 200 may include the first remote control apparatus 201 and the second remote control apparatus 202, and if the first control signal received from the first remote control apparatus 201 corresponds to the first complex command information and the second control signal received from the second remote control apparatus 202 corresponds to the single command information, the processor 130 may continuously perform control operations corresponding to a plurality of function informations included in the first control signal, and perform a control operation corresponding to the second control signal.

The feature that the first control signal corresponds to the first complex command information may mean that function information included in the first control signal falls under a function among the plurality of functions included in the complex command information. Also, the feature that the second control signal corresponds to the single command information may mean that function information included in the second control signal does not fall under a function among the plurality of functions included in the complex command information.

Meanwhile, a control signal may include a function of requesting return information to the remote control apparatus 200, and if the electronic apparatus 100 is in a state of being connected with the remote control apparatus 200 via Bluetooth communication through the communication interface 120, the processor 130 may transmit return information to the remote control apparatus 200, and if the electronic apparatus 100 is not in a state of being connected with the remote control apparatus 200 via Bluetooth communication through the communication interface 120, the processor 130 may perform Bluetooth communication connection with another remote control apparatus, and transmit return information to the another remote control apparatus.

Meanwhile, it will be assumed that a function included in a control signal is an operation of returning data stored in the electronic apparatus 100. According to a request of the remote control apparatus 200, the electronic apparatus 100 may return specific data (return information) to the remote control apparatus 200. Here, in order for the electronic apparatus 100 to return specific data (return information) to the remote control apparatus 200, communicative connection between the electronic apparatus 100 and the remote control apparatus 200 should be formed. Accordingly, the processor 130 may determine whether the electronic apparatus 100 is connected with the remote control apparatus 200 via Bluetooth communication before returning specific data (return information) to the remote control apparatus 200. If the electronic apparatus 100 and the remote control apparatus 200 are in a state of being connected via Bluetooth communication, the processor 130 may transmit specific data (return information) to the remote control apparatus 200. However, if the electronic apparatus 100 and the remote control apparatus 200 are not in a state of being connected via Bluetooth communication, the processor 130 cannot directly transmit data to the remote control apparatus 200, and thus there may be a need to indirectly transmit specific data (return information) to the remote control apparatus 200.

Here, if the electronic apparatus 100 is not in a state of being connected with the remote control apparatus 200 via Bluetooth communication through the communication interface 120, the processor 130 may transmit a control signal including return information and identification information of the remote control apparatus 200 to another remote control apparatus, and the control signal transmitted to the another remote control apparatus may be a signal that controls to transmit return information to the remote control apparatus 200 based on the identification information of the remote control apparatus 200.

If the electronic apparatus 100 and the remote control apparatus 200 are not in a state of being connected via Bluetooth communication, the processor 130 may indirectly transmit specific data (return information) to the remote control apparatus 200. Specifically, the processor 130 may identify another remote control apparatus connected with the electronic apparatus 100 via Bluetooth communication. An operation of transmitting specific data (return information) by using another remote control apparatus will be described in detail in FIG. 12. Here, a remote control apparatus that is not connected via Bluetooth communication may be a first remote control apparatus, and another remote control apparatus connected via Bluetooth communication may be a second remote control apparatus.

Meanwhile, complex command information may be information that sequentially mapped control codes corresponding to each of a plurality of functions based on order information.

Detailed explanation related to complex command information will be made in FIG. 13 to FIG. 15 below.

Meanwhile, the processor 130 may identify whether the remote control apparatus 200 has a history of Bluetooth communication connection with the electronic apparatus 100, and if it is identified that the remote control apparatus 200 does not have a history of being connected with the electronic apparatus 100 via Bluetooth communication, the processor 130 may control the communication interface 120 to transmit complex command information to the remote control apparatus 200.

In order that the remote control apparatus 200 generates a complex control signal and transmits the signal, and the electronic apparatus 100 receives the complex control signal and interprets the signal, information on the complex control signal should be shared between the electronic apparatus 100 and the remote control apparatus 200. That is, a mutual commitment may be needed regarding which of the existing functions will be grouped, and how they will be grouped. Information that determined a mutual commitment and organized it may be the complex command information. The electronic apparatus 100 storing the complex command information may analyze a received control signal and determine whether the control signal falls under a complex control signal. However, if the electronic apparatus 100 is not storing the complex command information, even if a complex control signal is received, processing corresponding to the complex control signal cannot be performed. Here, processing corresponding to a complex control signal may mean continuously processing functions included in a complex control signal.

In contrast, if the complex command information is not stored in the remote control apparatus 200, the remote control apparatus 200 cannot generate and transmit a complex control signal. Accordingly, the remote control apparatus 200 not storing the complex command information cannot help transmitting a general control signal (a single control signal) to the electronic apparatus 100.

Accordingly, there is a need that both of the electronic apparatus 100 and the remote control apparatus 200 should store the complex command information. The electronic apparatus 100 may store the complex command information through a manufacturing operation or a software update operation. The remote control apparatus 200 may store the complex command information through a manufacturing operation or download (or update) of an electronic apparatus control application.

The processor 130 may store a history of communicative connection with an external apparatus (a remote control apparatus) connected with the electronic apparatus 100 in the memory. Then, the processor 130 may determine whether a connection with the remote control apparatus 200 which is communicatively connected with it is an initial connection. In case the connection is an initial connection, the processor 130 may transmit the complex command information (a complex command list) to the remote control apparatus 200.

Meanwhile, if it is identified that a plurality of remote control apparatuses 200 including the remote control apparatus 200 are connected via Bluetooth communication through the communication interface 120, the processor 130 may transmit a request signal making a control signal transmitted based on the complex command information to the remote control apparatus 200.

In general, the electronic apparatus 100 and the remote control apparatus 200 perform 1:1 communication with each other, and thus signal interference is not generated. However, in case 1:N communication is performed in an exceptional situation, a problem of signal interference may occur. Here, an exceptional situation may mean a situation wherein one electronic apparatus 100 and a plurality of remote control apparatuses are connected.

Accordingly, a process wherein the electronic apparatus 100 and the remote control apparatus 200 according to the disclosure perform control operations using the complex command information was described. However, depending on embodiments, there may not be a need that all control operations should be performed based on a complex control signal. As an act of additional operation is needed for generating a complex control signal while control codes corresponding to basic functions are stored, it would be ineffective to generate a complex control signal in a situation of 1:1 communication. Accordingly, the electronic apparatus 100 according to the disclosure may request to generate a complex control signal limited to a case of performing 1:N communication.

Specifically, in case there is one remote control apparatus 200 which formed communicative connection with the electronic apparatus 100, the processor 130 may receive a control signal by the previous method. However, in case there are two or more remote control apparatuses 200 which formed communicative connection with the electronic apparatus 100, the processor 130 may request a plurality of remote control apparatuses which formed communicative connection with the electronic apparatus 100 to transmit complex control signals. The plurality of remote control apparatuses may generate complex control signals by a method different from the previous method and transmit the signals, according to the request of the electronic apparatus 100. According to such an operation, the electronic apparatus 100 according to the disclosure may distinguish 1:1 communication and 1:N communication, and an act of additional operation (generation of a complex control signal or analysis of a complex control signal) may be performed only in a situation wherein signal interference occurs (1:N communication).

Figure 2:
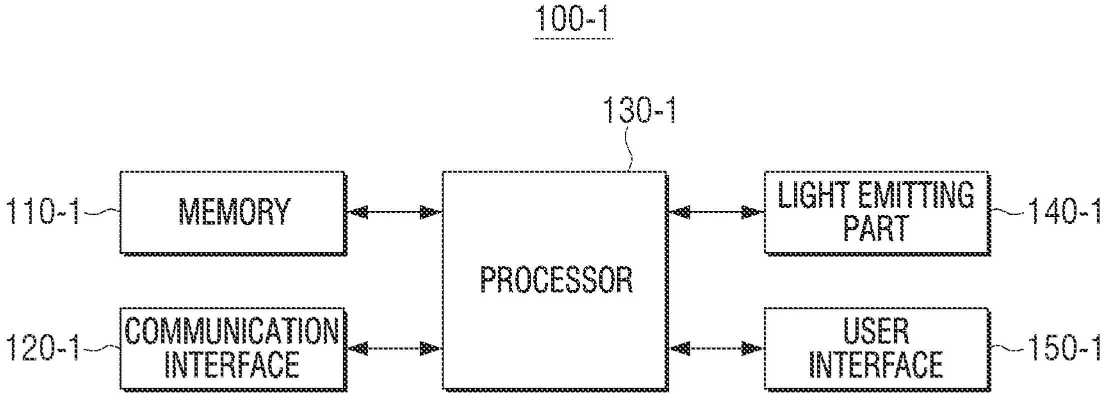
FIG. 2 is a block diagram for illustrating a detailed configuration of the electronic apparatus in FIG. 1 according to an embodiment of the disclosure.

FIG. 2 is a block diagram for illustrating a detailed configuration of the electronic apparatus in FIG. 1 according to an embodiment of the disclosure.

Referring to FIG. 2, the electronic apparatus 100 may include at least one of a memory 110-1, a communication interface 120-1, a processor 130-1, a light emitting part 140-1, or a user interface 150-1.

The electronic apparatus 100 disclosed in FIG. 2 may mean an LED mask apparatus. An LED mask apparatus may mean a skin care apparatus that irradiates (or outputs) a light output from the light emitting part 140-1 on the skin of a user (e.g., the face).

As the memory 110-1, the communication interface 120-1, and the processor 130-1 in FIG. 2 may correspond to the memory 110, the communication interface 120, and the processor 130 in FIG. 1, overlapping explanation will be omitted.

The light emitting part 140-1 may mean a plurality of light emitting diodes (LEDs). Specifically, it may also mean semiconductor devices which emit lights according to the size of a voltage when a voltage is applied to the light emitting part 140-1. The light emitting part 140-1 may output lights in various wavelength bands according to user setting. For example, the light emitting part 140-1 may output a light of at least one area among infrared ray, visible ray, and ultraviolet ray areas. Also, the light emitting part 140-1 may output a light of a specific wavelength band.

The user interface 150-1 may be implemented as a device such as a button, a touch pad, a mouse, and a keyboard, or it may also be implemented as a touch screen that can perform the aforementioned display function and a manipulation input function together. Here, the button may be buttons of various types such as a mechanical button, a touch pad, a wheel, etc. formed in any areas such as the front surface part or the side surface part, the rear surface part, etc. of the exterior of the main body of the electronic apparatus 100.

Figure 3:
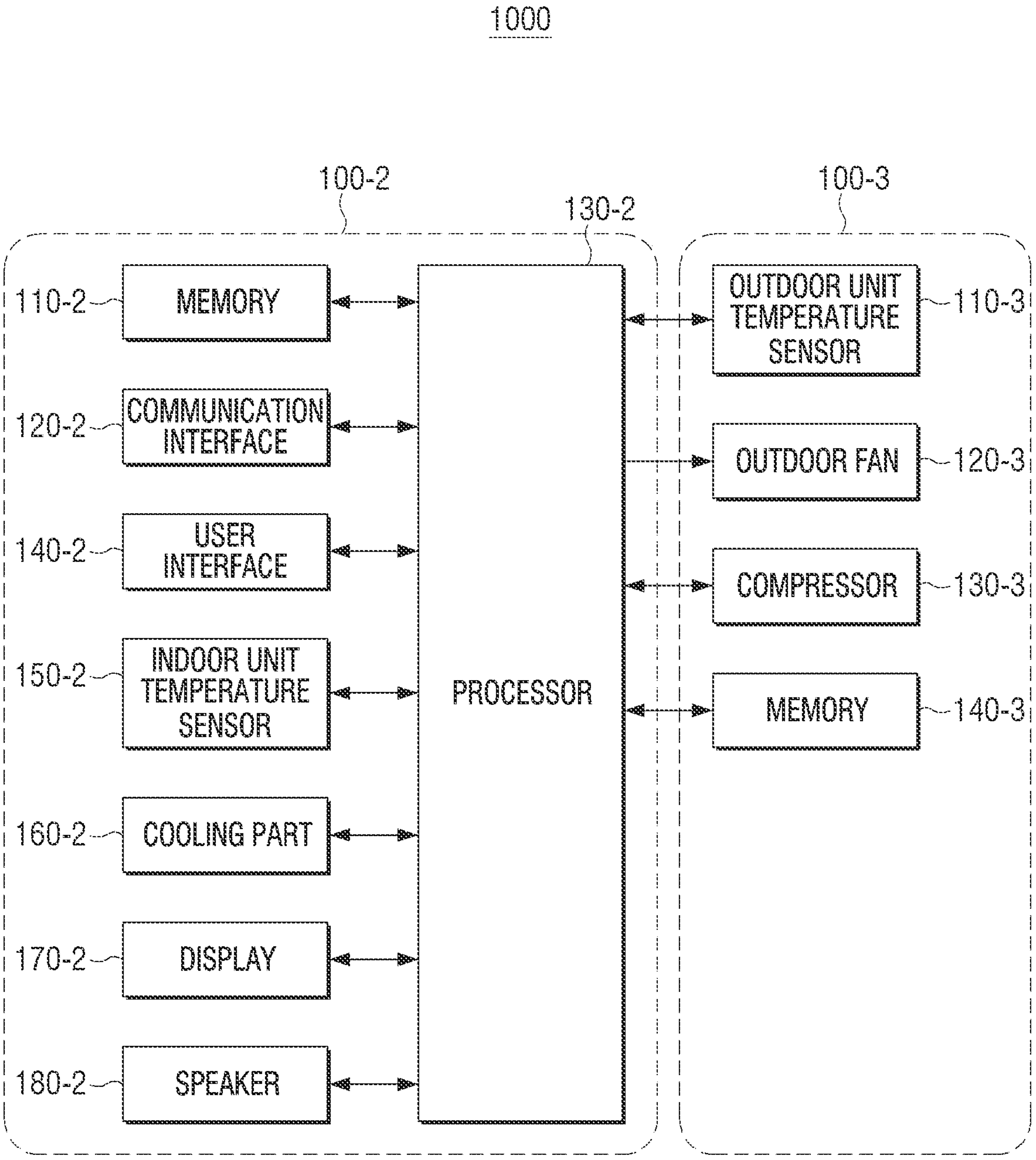
FIG. 3 is a block diagram for illustrating a detailed configuration of the electronic apparatus in FIG. 1 according to an embodiment of the disclosure.

FIG. 3 is a block diagram for illustrating a detailed configuration of the electronic apparatus in FIG. 1 according to another embodiment of the disclosure.

Referring to FIG. 3, the air conditioner 1000 may include an indoor unit 100-2 and an outdoor unit 100-3.

Also, the indoor unit 100-2 may include at least one of a memory 110-2, a communication interface 120-2, a processor 130-2, a user interface 140-2, an indoor unit temperature sensor 150-2, a cooling part 160-2, a display 170-2, or a speaker 180-2.

The electronic apparatus 100 disclosed in FIG. 3 may mean the air conditioner 1000. The air conditioner 1000 performs an operation for conditioning the indoor air. Specifically, the air conditioner 1000 may be a cooling device that lowers the temperature of the indoor air according to an embodiment of the disclosure. According to another embodiment of the disclosure, the air conditioner 1000 may perform at least one air conditioning among heating that raises the temperature of the indoor air, air blast that forms air currents indoors, and dehumidification that lowers indoor humidity. Specifically, the air conditioner 1000 may include an outdoor unit 100-3 that exchanges heat with the outdoor air by using a refrigerant and an indoor unit 100-2 that exchanges a refrigerant with the outdoor unit 100-3 and performs a conditioning operation of the indoor air.

Here, as the memory 110-2, the communication interface 120-2, the processor 130-2, and the memory 140-3 may correspond to the memory 110, the communication interface 120, and the processor 130 in FIG. 1, overlapping explanation will be omitted.

The user interface 140-2 may be implemented as a device such as a button, a touch pad, a mouse, and a keyboard, or it may also be implemented as a touch screen that can perform the aforementioned display function and a manipulation input function together. Here, the button may be buttons of various types such as a mechanical button, a touch pad, a wheel, etc. formed in any areas such as the front surface part or the side surface part, the rear surface part, etc. of the exterior of the main body of the indoor unit 100-2.

The indoor unit temperature sensor 150-2 may be a component detecting the temperature of the indoor space. Specifically, the indoor unit temperature sensor 150-2 may measure the indoor temperature of the space wherein the indoor unit 100-2 is arranged based on a control signal of the processor 130-2. Meanwhile, the indoor unit temperature sensor 150-2 may be installed in any place if it is a place wherein the temperature of the indoor air can be detected.

The cooling part 160-2 is a component conditioning the indoor air by discharging air of which temperature is controlled. Specifically, the cooling part 160-2 may include an indoor heat exchanger, an expansion valve, an air blast valve, etc.

Here, the indoor heat exchanger may exchange heat between air introduced into the indoor unit 100-2 and a refrigerant provided from the outdoor unit. Specifically, the indoor heat exchanger may perform the role of an evaporator during cooling. That is, the indoor heat exchanger may make latent heat that is necessary for a phase transition wherein a refrigerant in a fog state of a low pressure and a low temperature evaporates into a gas absorbed from the air introduced into the indoor unit 100-2. In contrast, the indoor heat exchanger may perform the role of a condenser during heating. That is, if the flow of a refrigerant is reversed opposite to cooling, the heat of the refrigerant passing through the indoor heat exchanger may be released into the air introduced into the indoor unit 100-2.

The expansion valve adjusts the pressure of a refrigerant. Specifically, the expansion valve may expand a refrigerant of a high pressure and a low temperature that passed through the outdoor heat exchanger during cooling and lower the pressure. Also, the expansion valve may adjust the amount of the refrigerant introduced into the indoor heat exchanger. In contrast, the expansion valve may expand a refrigerant of a low pressure and a high temperature before transmitting the refrigerant that passed through the indoor heat exchanger during heating to the outdoor heat exchanger and lower the pressure. Also, the expansion valve may adjust the amount of the refrigerant introduced into the outdoor heat exchanger.

The air blast fan may introduce the outdoor air to the inside of the indoor unit 100-2, and discharge air of which temperature has been changed by a heat exchange to the outside of the indoor unit 100-2.

Also, the cooling part 160-2 may adjust the temperature of the air discharged to the indoor space and the strength of the wind, etc. according to control of the processor 130-2.

Meanwhile, for the convenience of explanation, the component controlling the temperature of the air is referred to as the cooling part 160-2. However, the cooling part 160-2 is not limited to cooling, but it may also perform at least one air conditioning among heating that raises the temperature of the indoor air, air blast that forms air currents indoors, and dehumidification that lowers indoor humidity.

The display 170-2 may be implemented as displays in various forms such as a liquid crystal display (LCD), an organic light emitting diodes (OLED) display, a plasma display panel (PDP), etc. Inside the display 170-2, driving circuits that may be implemented in forms such as an a-si TFT, a low temperature poly silicon (LTPS) TFT, and an organic TFT (OTFT), a backlight unit, etc. may also be included together. Meanwhile, the display 170-2 may be implemented as a touch screen combined with a touch sensor, a flexible display, a 3D display, etc.

The speaker 180-2 may be a component outputting various kinds of notification sounds or voice messages, etc. as well as various kinds of audio data. Specifically, the speaker 180-2 may output notification information regarding an abnormal environment as a voice.

Meanwhile, the outdoor unit 100-3 may include at least one of an outdoor unit temperature sensor 110-3, an outdoor fan 120-3, a compressor 130-3, or a memory 140-3.

The outdoor unit temperature sensor 110-3 may be a component for detecting the temperature of the space wherein the outdoor unit 100-3 is installed. According to an embodiment of the disclosure, in case the outdoor unit 100-3 is installed outdoors, the outdoor unit temperature sensor 110-3 may detect the outdoor temperature. According to another embodiment of the disclosure, in case the outdoor unit 100-3 is installed in an outdoor unit chamber, the outdoor unit temperature sensor 110-3 may detect the temperature of the outdoor unit chamber. Meanwhile, the outdoor unit temperature sensor 110-3 may be arranged (or installed) in any location if it is a location wherein the temperature can be detected.

The outdoor fan 120-3 may be a component that forcibly discharges the outdoor air by an outdoor fan motor so that a heat exchange is performed at the outdoor heat exchanger. Also, the rotating speed of the outdoor fan 120-3 may be changed based on a control signal transmitted from the processor 130-2.

The compressor 130-3 may be a component that compresses a refrigerant into a gas state of a high temperature and a high pressure.

The memory 140-3 may be a component that stores setting information related to the outdoor unit, control information, or various kinds of information.

Figure 4:
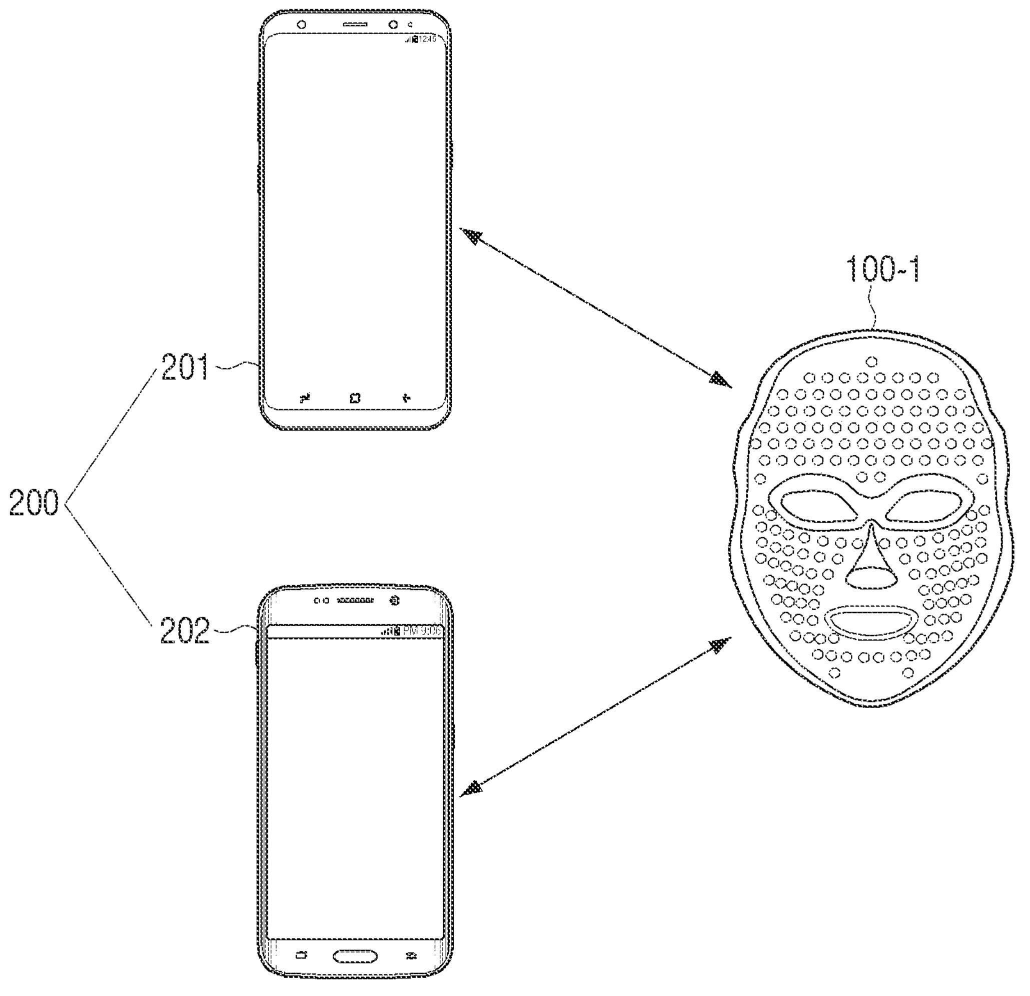
FIG. 4 is a diagram for illustrating Bluetooth communication between an electronic apparatus and a plurality of remote control apparatuses according to an embodiment of the disclosure.

FIG. 4 is a diagram for illustrating Bluetooth communication between an electronic apparatus and a plurality of remote control apparatuses according to an embodiment of the disclosure.

Referring to FIG. 4, the electronic apparatus 100 may perform Bluetooth communication connection with the first remote control apparatus 201 and the second remote control apparatus 202 through Bluetooth communication. Here, the first remote control apparatus 201 and the second remote control apparatus 202 may be described as the remote control apparatuses 200. In FIG. 4, it is described that there are a plurality of remote control apparatuses 200, but depending on embodiments, the remote control apparatus may be implemented as one control apparatus.

Here, the electronic apparatus 100 may be an LED mask apparatus 100-1, and the first remote control apparatus 201 and the second remote control apparatus 202 may be mobile apparatuses. The LED mask apparatus 100-1 may be communicatively connected with the first remote control apparatus 201 and the second remote control apparatus 202 through Bluetooth communication simultaneously, and it may receive a control signal from each remote control apparatus. Also, both of the first remote control apparatus 201 and the second remote control apparatus 202 may be mobile apparatuses. The LED mask apparatus 100-1 may receive control signals of different mobile apparatuses.

Meanwhile, in the case of receiving control signals through different remote control apparatuses, there may be a problem of signal interference. Explanation regarding signal interference will be made in FIG. 5 below.

Figure 5:
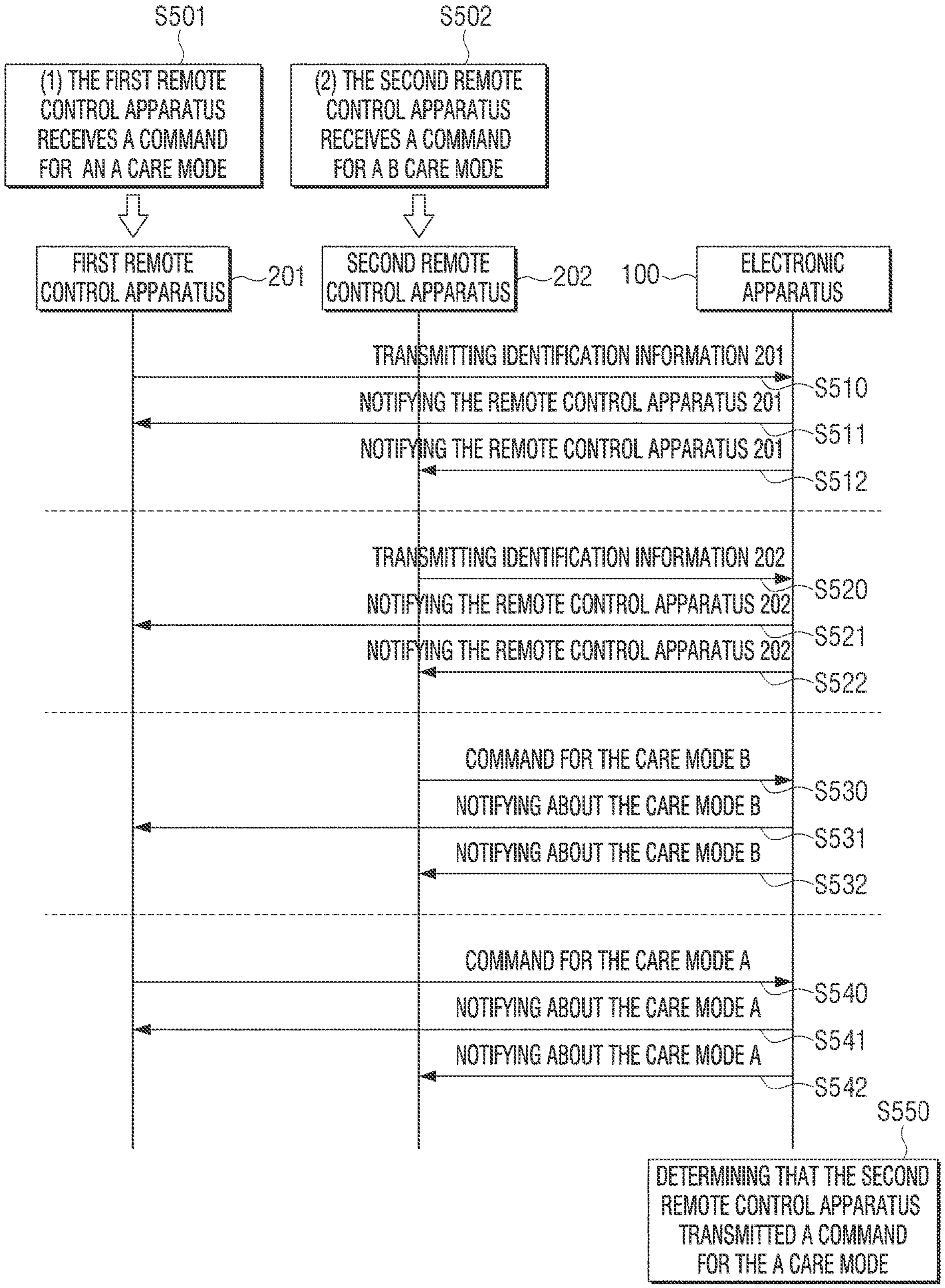
FIG. 5 is a flow chart for illustrating an embodiment of transmitting signals from a plurality of remote control apparatuses to an electronic apparatus according to an embodiment of the disclosure.

FIG. 5 is a flow chart for illustrating an embodiment of transmitting signals from a plurality of remote control apparatuses to an electronic apparatus according to an embodiment of the disclosure.

Referring to FIG. 5, the first remote control apparatus 201 and the second remote control apparatus 202 may simultaneously transmit control signals to the electronic apparatus 100. Transmitting control signals simultaneously may mean transmitting control signals at almost similar time points.

It will be assumed that the first remote control apparatus 201 received a command for setting an A care mode at operation S501, and the second remote control apparatus

202 received a command for setting a B care mode at operation S502. In general, in the case of transmitting a specific command, identification information of the subject of transmission may also be transmitted. That is, the first remote control apparatus 201 may transmit identification information for the first remote control apparatus 201 to the electronic apparatus 100, and transmit a control signal for the command for setting an A care mode afterwards. Then, the second remote control apparatus 202 may transmit identification information for the second remote control apparatus 202 to the electronic apparatus 100, and transmit a control signal for the command for setting a B care mode afterwards.

If any one remote control apparatus among the first remote control apparatus 201 and the second remote control apparatus 202 is connected with the electronic apparatus 100 via Bluetooth communication, there may not be a confusion among control signals. However, if the first remote control apparatus 201 and the second remote control apparatus 202 are simultaneously connected with the electronic apparatus 100 via Bluetooth communication, there may be a confusion among control signals.

Specifically, the first remote control apparatus 201 may transmit identification information of the first remote control apparatus 201 to the electronic apparatus 100 at operation S510. Then, the electronic apparatus 100 may transmit notification information indicating that the received identification information is regarding the first remote control apparatus 201 to the first remote control apparatus 201 at operation S511. Then, the electronic apparatus 100 may also transmit notification information indicating that the received identification information is regarding the first remote control apparatus 201 to the second remote control apparatus 202 at operation S512.

Here, the second remote control apparatus 202 may transmit identification information of the second remote control apparatus 202 to the electronic apparatus 100 at operation S520. Then, the electronic apparatus 100 may transmit notification information indicating that the received identification information is regarding the second remote control apparatus 202 to the first remote control apparatus 201 at operation S521. Then, the electronic apparatus 100 may also transmit notification information indicating that the received identification information is regarding the second remote control apparatus 202 to the second remote control apparatus 202 at operation S522.

Here, the second remote control apparatus 202 may transmit a control signal for setting a B care mode to the electronic apparatus 100 at operation S530. Then, the electronic apparatus 100 may transmit notification information that the B care mode was set to the first remote control apparatus 201 at operation S531. Then, the electronic apparatus 100 may transmit notification information that the B care mode was set to the second remote control apparatus 202 at operation S532.

Here, the first remote control apparatus 201 may transmit a control signal for setting an A care mode to the electronic apparatus 100 at operation S540. Then, the electronic apparatus 100 may transmit notification information that the A care mode was set to the first remote control apparatus 201 at operation S541. Then, the electronic apparatus 100 may transmit notification information that the A care mode was set to the second remote control apparatus 202 at operation S542.

The electronic apparatus 100 may receive the identification information of the second remote control apparatus 202 at operation S520 after receiving the identification information of the first remote control apparatus 201 at operation S510. Accordingly, the electronic apparatus 100 may ultimately determine that the identification information of the second remote control apparatus 202 was received based on the identification information received later.

Then, the electronic apparatus 100 may determine that the control signal for the A care mode at operation S540 was received that was received later regarding the commands for setting a care mode.

Ultimately, the electronic apparatus 100 may determine that the second remote control apparatus 202 transmitted a control signal for the command for setting the A care mode at operation S550. However, in actuality, what transmitted the command for setting the A care mode is the first remote control apparatus 201, and the second remote control apparatus 202 transmitted the command for setting the B care mode, and thus there may be a problem that a confusion may exist for the electronic apparatus 100 by interference of the received control signals.

Figure 6:
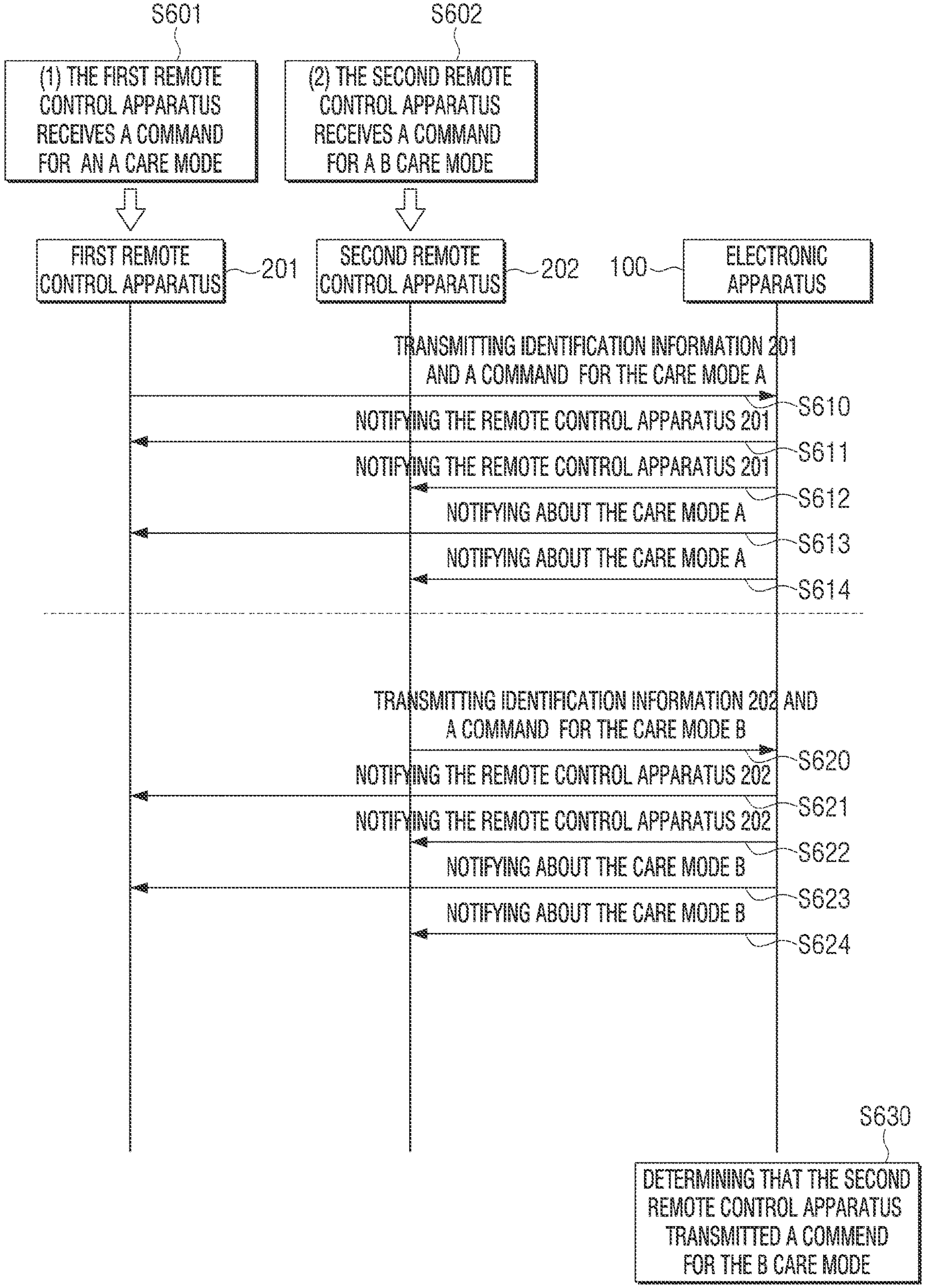
FIG. 6 is a flow chart for illustrating another embodiment of transmitting signals from a plurality of remote control apparatuses to an electronic apparatus according to an embodiment of the disclosure.

FIG. 6 is a flow chart for illustrating another embodiment of transmitting signals from a plurality of remote control apparatuses to an electronic apparatus according to an embodiment of the disclosure.

Referring to FIG. 6, it is assumed that the first remote control apparatus 201 received a command for setting an A care mode at operation S601, and the second remote control apparatus 202 received a command for setting a B care mode at operation S602. Here, each of the first remote control apparatus 201 and the second remote control apparatus 202 may group some commands and transmit the commands. Specifically, the first remote control apparatus 201 and the second remote control apparatus 202 may group identification information and commands for setting a care mode and transmit them together.

The first remote control apparatus 201 may transmit identification information of the first remote control apparatus 201 and a command for setting an A care mode together to the electronic apparatus 100 at operation S610. Then, the electronic apparatus 100 may transmit notification information indicating that the received identification information is regarding the first remote control apparatus 201 to the first remote control apparatus 201 at operation S611. Then, the electronic apparatus 100 may also transmit notification information indicating that the received identification information is regarding the first remote control apparatus 201 to the second remote control apparatus 202 at operation S612. Then, the electronic apparatus 100 may transmit notification information that the A care mode was set to the first remote control apparatus 201 at operation S613. Then, the electronic apparatus 100 may transmit notification information that the A care mode was set to the second remote control apparatus 202 at operation S614.

Also, the second remote control apparatus 202 may transmit identification information of the second remote control apparatus 202 and a command for setting a B care mode together to the electronic apparatus 100 at operation S620. Then, the electronic apparatus 100 may transmit notification information indicating that the received identification information is regarding the second remote control apparatus 202 to the first remote control apparatus 201 at operation S621. Then, the electronic apparatus 100 may also transmit notification information indicating that the received identification information is regarding the second remote control apparatus 202 to the second remote control apparatus 202 at operation S622. Then, the electronic apparatus 100 may transmit notification information that the B care mode was set to the first remote control apparatus 201 at operation S623. Then, the electronic apparatus 100 may transmit notification information that the B care mode was set to the second remote control apparatus 202 at operation S624.

Here, the electronic apparatus 100 may receive specific control signals together from the first remote control apparatus 201 and the second remote control apparatus 202 and thereby prevent the problem of interference of control signals. The electronic apparatus 100 may receive identification information and a command for setting an A care mode together from the first remote control apparatus 201, and receive identification information and a command for setting a B care mode together from the second remote control apparatus 202 afterwards. Ultimately, the electronic apparatus 100 may determine that the second remote control apparatus 202 transmitted identification information and a control signal for the command for setting a B care mode at operation S630.

Figure 7:
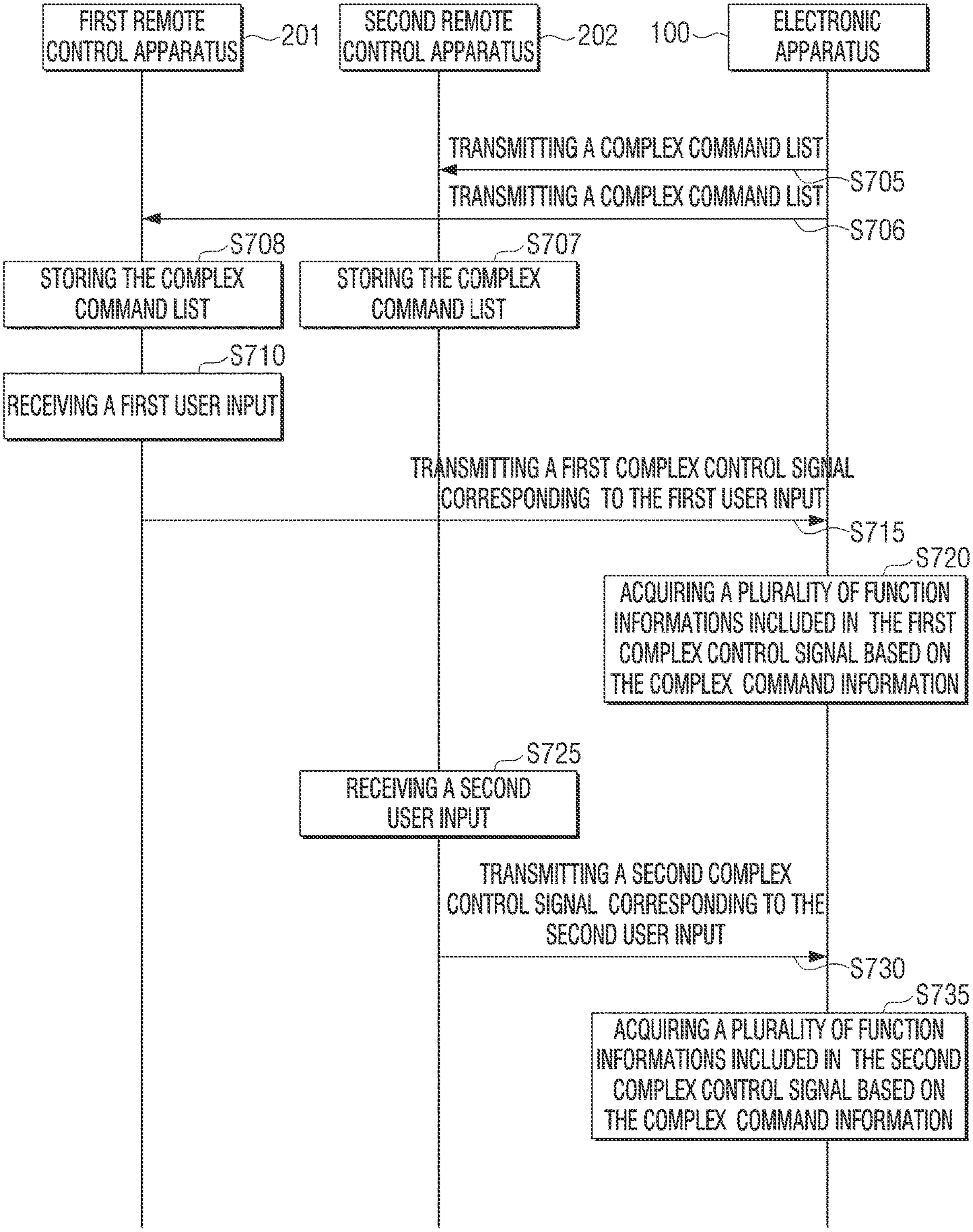
FIG. 7 is a flow chart for illustrating an operation of a remote control apparatus of transmitting a signal by using a complex command according to an embodiment of the disclosure.

Unlike in the embodiment of FIG. 6, in the embodiment of FIG. 7, some commands are grouped and transmitted together, and thus there may be an effect that signal interference among a plurality of remote control apparatuses can be prevented.

FIG. 7 is a flow chart for illustrating an operation of a remote control apparatus of transmitting a signal by using a complex command according to an embodiment of the disclosure.

Referring to FIG. 7, the electronic apparatus 100 may transmit a complex command list to the second remote control apparatus 202 at operation S705. Then, the electronic apparatus 100 may transmit the complex command list to the first remote control apparatus 201 at operation S706. Here, the second remote control apparatus 202 may store the received complex command list at operation S707. Then, the first remote control apparatus 201 may store the received complex command list at operation S708. Here, the operations S705, S706, S707, and S708 may be performed only for the initial first time.

The first remote control apparatus 201 may receive a first user input at operation S710. Here, the first user input may mean a physical touch input of the first remote control apparatus 201, or a predetermined control input. Then, the first remote control apparatus 201 may transmit a first complex control signal corresponding to the first user input to the electronic apparatus 100 at operation S715. Then, the electronic apparatus 100 may acquire a plurality of function informations included in the first complex control signal based on the complex command information stored in the electronic apparatus 100 at operation S720.

Meanwhile, the second remote control apparatus 202 may receive a second user input at operation S725. Here, the second user input may mean a physical touch input of the second remote control apparatus 202, or mean a predetermined control input. Then, the second remote control apparatus 202 may transmit a second complex control signal corresponding to the second user input to the electronic apparatus 100 at operation S730. Then, the electronic apparatus 100 may acquire a plurality of function informations included in the second complex control signal based on the complex command information stored in the electronic apparatus 100 at operation S735.

There may be a plurality of single commands received at operation S720 and operation S735. Then, the electronic apparatus 100 may determine how to process the acquired at least one single command. In general, control operations corresponding to the single commands may be performed in order based on the order information. Meanwhile, the electronic apparatus 100 may perform only the final signal command instead of performing meaningless single commands. A detailed operation in this regard will be described in FIG. 8 below.

Figure 8:
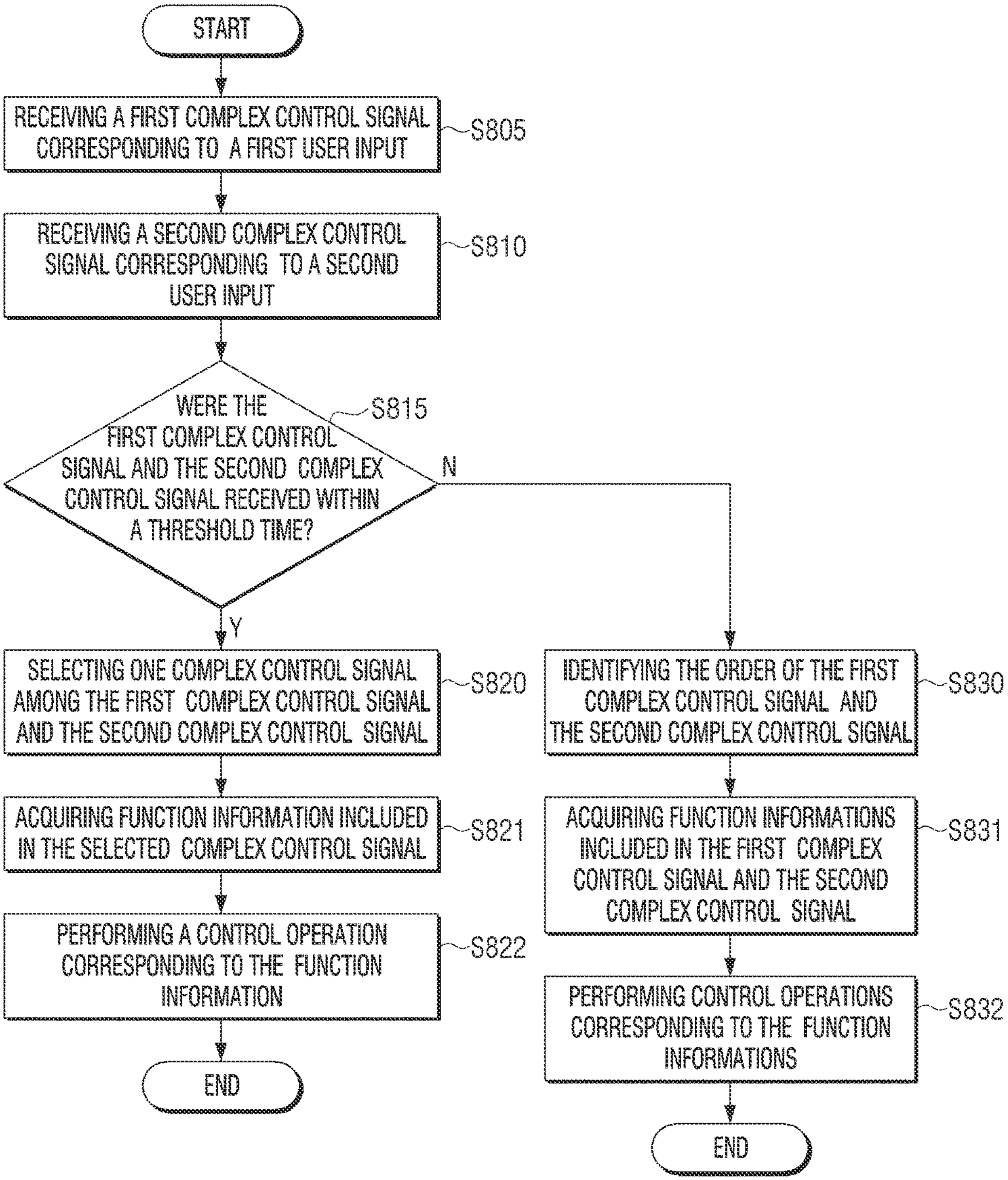
FIG. 8 is a flow chart of an operation of receiving complex control signals from a plurality of remote control apparatuses according to an embodiment of the disclosure.

FIG. 8 is a flow chart of an operation of receiving complex control signals from a plurality of remote control apparatuses according to an embodiment of the disclosure.

Referring to FIG. 8, the electronic apparatus 100 may receive a first complex control signal corresponding to a first user input from the first remote control apparatus 201 at operation S805. The operation S805 may be related to the operation S715 in FIG. 7. Then, the electronic apparatus 100 may receive a second complex control signal corresponding to a second user input from the second remote control apparatus 202 at operation S810. The operation S810 may be related to the operation S730 in FIG. 7.

The electronic apparatus 100 may determine whether the received first complex control signal and second complex control signal were received within a threshold time at operation S815.

Meanwhile, if it is determined that the first complex control signal and the second complex control signal were received within a threshold time, the electronic apparatus 100 may select one complex control signal among the first remote control apparatus 201 and the second complex control signal at operation S820. Specifically, the standard of selection may be the time order. The electronic apparatus 100 according to an embodiment of the disclosure may select only the complex control signal received later. However, this is merely an example, and various standards of selection may be applied. Here, the electronic apparatus 100 may acquire function information included in the selected complex control signal at operation S821. Here, the electronic apparatus 100 may perform a control operation corresponding to the acquired function information at operation S822.

Meanwhile, if it is determined that the first complex control signal and the second complex control signal were not received within a threshold time, the electronic apparatus 100 may identify the order of the first complex control signal and the second complex control signal at operation S830. Specifically, the electronic apparatus 100 may determine which complex control signal was received first. Here, the electronic apparatus 100 may acquire function information included in the first complex control signal, and acquire function information included in the second complex control signal at operation S831. Here, the electronic apparatus 100 may perform a control operation corresponding to the acquired function information at operation S832.

Meanwhile, the description of FIG. 8 may be an embodiment which is effective in case a complex control signal is not a command performing an immediate control operation. In case the electronic apparatus 100 does not perform a control operation as much as the threshold time, the processing speed may be lowered, and consumers may feel inconvenience. Accordingly, the embodiment of FIG. 8 of processing in consideration of the threshold time can be applied limited to a control signal that does not perform an immediate control operation. Depending on embodiments, the electronic apparatus 100 may additionally include an operation of determining whether the first complex control signal and the second complex control signal should perform immediate control operations before the operation S815.

Figure 9:
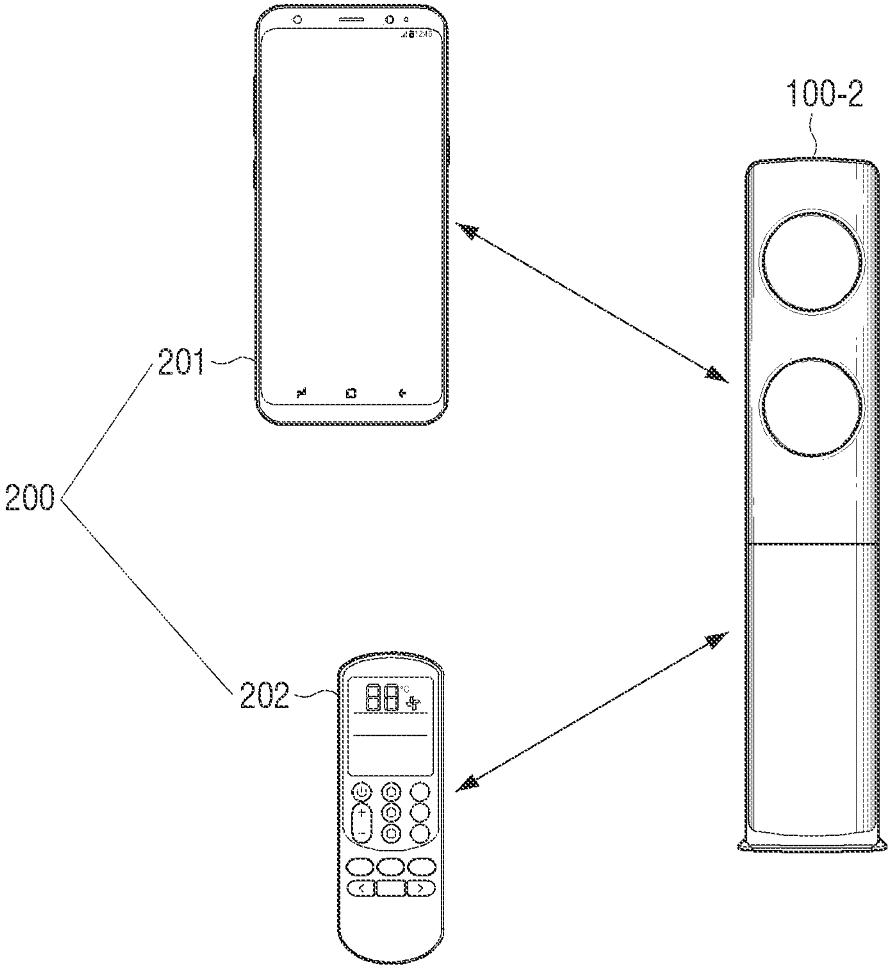
FIG. 9 is a diagram for illustrating Bluetooth communication between an electronic apparatus and a plurality of remote control apparatuses according to an embodiment of the disclosure.

FIG. 9 is a diagram for illustrating Bluetooth communication between an electronic apparatus and a plurality of remote control apparatuses according to an embodiment of the disclosure.

Referring to FIG. 9, the electronic apparatus 100 may perform Bluetooth communication connection with the first remote control apparatus 201 and the second remote control apparatus 202. Here, the electronic apparatus 100 may be the indoor unit 100-2 in the air conditioner 1000, and the first remote control apparatus 201 may be a mobile apparatus, and the second remote control apparatus 202 may be a remote control apparatus that can perform Bluetooth communication.

The indoor unit 100-2 of the air conditioner 1000 may receive respective control signals from a mobile apparatus and a remote control by using Bluetooth communication. A specific embodiment in this regard will be described in FIG. 10 to FIG. 12 below.

Figure 10:
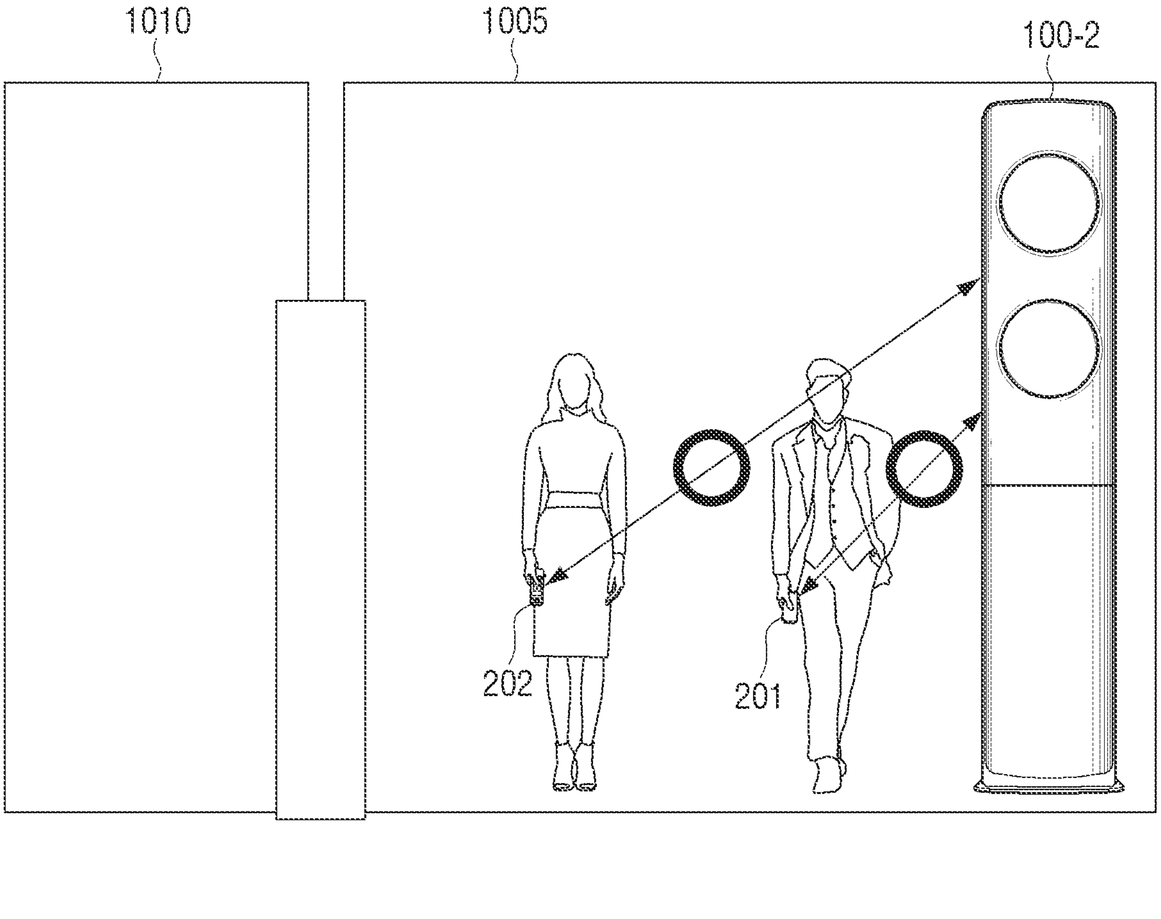
FIG. 10 is a diagram for illustrating an embodiment wherein a plurality of remote control apparatuses are connected with an electronic apparatus via Bluetooth according to an embodiment of the disclosure.

FIG. 10 is a diagram for illustrating an embodiment wherein a plurality of remote control apparatuses are connected with an electronic apparatus via Bluetooth according to an embodiment of the disclosure.

Referring to FIG. 10, the electronic apparatus 100 (corresponding to the indoor unit 100-2 in FIG. 10) may be connected with the first remote control apparatus 201 and the second remote control apparatus 202 located in a first area 1005 among the first area 1005 and a second area 1010 by using Bluetooth communication. As the electronic apparatus 100 may perform Bluetooth communication simultaneously with the first remote control apparatus 201 and the second remote control apparatus 202, the electronic apparatus 100 may receive a control signal from each remote control apparatus. That is, the electronic apparatus 100 may perform Bluetooth communication of 1:N with a plurality of remote control apparatuses.

Figure 11:
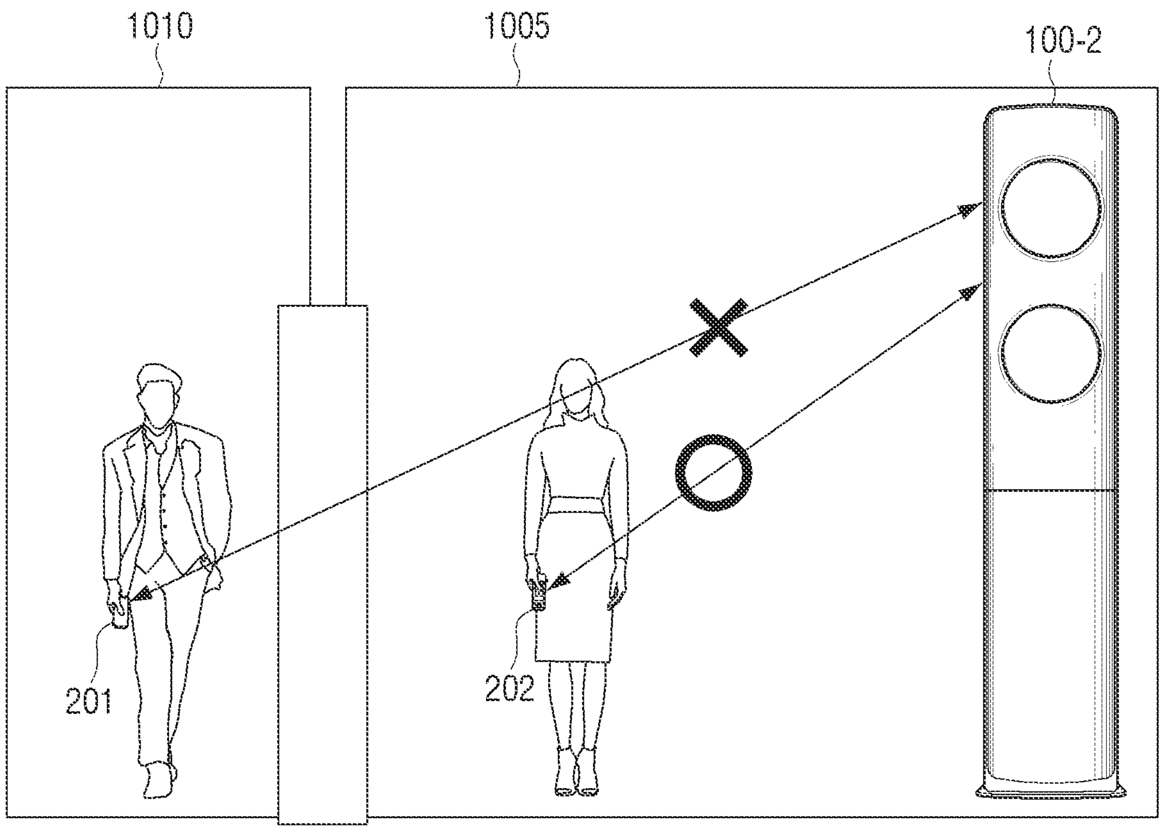
FIG. 11 is a diagram for illustrating an embodiment wherein a Bluetooth connection with the remote control apparatuses in the embodiment in FIG. 10 is disconnected according to an embodiment of the disclosure.

FIG. 11 is a diagram for illustrating an embodiment wherein the Bluetooth connection with the remote control apparatuses in the embodiment in FIG. 10 is disconnected according to an embodiment of the disclosure.

Referring to FIG. 11, in the embodiment described in FIG. 10, Bluetooth communication connection of the first remote control apparatus 201 located in the second area 1010 with the electronic apparatus 100 may be disconnected. If the Bluetooth communication connection with the first remote control apparatus 201 is disconnected, the electronic apparatus 100 may perform communicative connection with the second remote control apparatus 202 located in the first area 1005. As described in FIG. 10, the electronic apparatus 100 was already performing Bluetooth communication of 1:N, and accordingly, even if connection with the first remote control apparatus 201 is disconnected, the electronic apparatus 100 may immediately receive a control signal through the second remote control apparatus 202.

Meanwhile, in case Bluetooth connection with the first remote control apparatus 201 is disconnected while the electronic apparatus 100 transmits return information to the first remote control apparatus 201, a problem may occur. A detailed operation in this regard will be described in FIG. 12 below.

Figure 12:
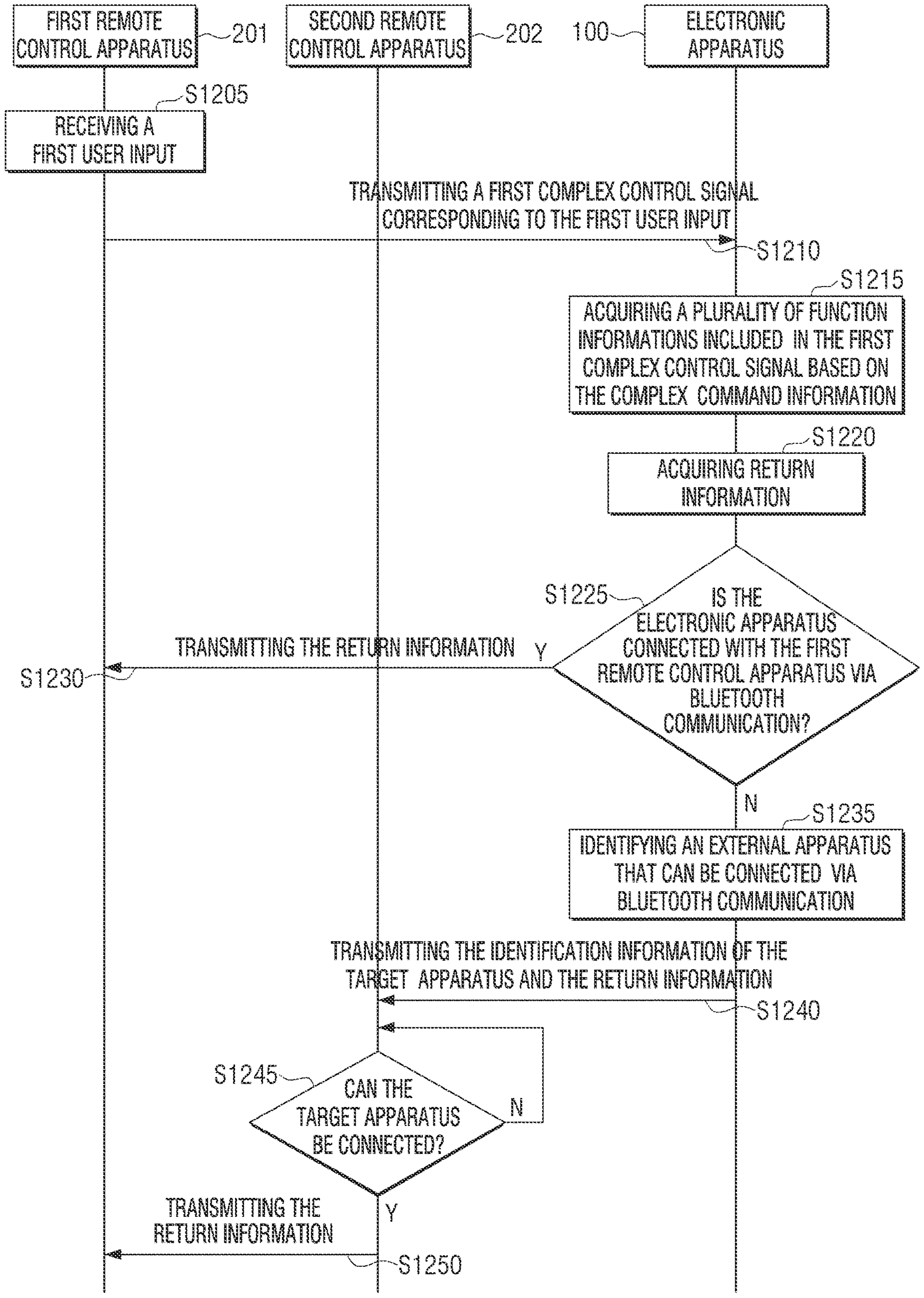
FIG. 12 is a flow chart for illustrating operations of a plurality of remote control apparatuses and the electronic apparatus in the embodiment described in FIG. 11 according to an embodiment of the disclosure.

FIG. 12 is a flow chart for illustrating the operations of the plurality of remote control apparatuses and the electronic apparatus in the embodiment described in FIG. 11 according to an embodiment of the disclosure.

Referring to FIG. 12, the first remote control apparatus 201 may receive a first user input at operation S1205. Then, the first remote control apparatus 201 may transmit a first complex control signal corresponding to the first user input to the electronic apparatus 100 at operation S1210. Here, the electronic apparatus 100 may acquire a plurality of function informations included in the first complex control signal based on complex command information at operation S1215. Here, it will be assumed that one function information among the plurality of function informations included in the first complex control signal is a command requesting to return specific data at the electronic apparatus 100. The electronic apparatus 100 may acquire (or sense) specific data and acquire information to be returned (hereinafter, it will be described as return information) at operation S1220. Here, the electronic apparatus 100 may determine whether Bluetooth communication connection is formed with the first remote control apparatus 201 that is a subject to which return information will be transmitted at operation S1225. Specifically, the electronic apparatus 100 may identify whether Bluetooth communication is connected with the first remote control apparatus 201. If Bluetooth communication is not connected with the first remote control apparatus 201, the electronic apparatus 100 cannot directly transmit return information, and thus the operation S1225 may be performed before transmitting return information.

If it is a state wherein Bluetooth communication connection has been formed between the first remote control apparatus 201 and the electronic apparatus 100, the electronic apparatus 100 may transmit return information to the first remote control apparatus 201 at operation S1230.

Meanwhile, if it is a state wherein Bluetooth communication connection has been disconnected between the first remote control apparatus 201 and the electronic apparatus 100, the electronic apparatus 100 may identify a separate external apparatus that can be connected to Bluetooth communication at operation S1235. Specifically, the electronic apparatus 100 may identify an external apparatus included in the Bluetooth communication to which the electronic apparatus 100 belongs. Here, it will be assumed that an external apparatus included in the Bluetooth communication to which the electronic apparatus 100 belongs is the second remote control apparatus 202. The electronic apparatus 100 may transmit target apparatus identification information (the first remote control apparatus 201) and return information to the second remote control apparatus 202 at operation S1240. As the operation S1215 and the operation S1220 are related to an operation of returning to the first remote control apparatus 201, the target apparatus identification information may include information for the first remote control apparatus 201.

Meanwhile, the second remote control apparatus 202 may determine whether it can be connected with the target apparatus based on the received target apparatus identification information at operation S1245. Specifically, in case the target apparatus identification information does not coincide with the identification information of itself, the second remote control apparatus 202 may transmit the received return information to the target apparatus. Specifically, the second remote control apparatus 202 may perform the operation S1245. If the second remote control apparatus 202 and the target apparatus cannot be connected, the second remote control apparatus 202 may perform the operation S1245 for every predetermined period. Here, if the second remote control apparatus 202 can be connected with the target apparatus, the second remote control apparatus 202 may transmit the return information to the first remote control apparatus 201 at operation S1250.

FIG. 13 is a diagram for illustrating complex command information according to an embodiment of the disclosure.

Referring to FIG. 13, the electronic apparatus 100 may store code information for each function and complex command information 1310 in the memory.

The code information for each function may mean code information used for controlling the electronic apparatus 100, and code information may vary for each function. In particular, the code information for each function may be related to a control signal received from the remote control apparatus 200. Specifically, a remote control apparatus may store code information for each function in the memory in advance, and in the case of transmitting a command for a specific function to the electronic apparatus 100, the remote control apparatus may transmit a control signal by using the code information for each function.

Meanwhile, the code information for each function may include code information for a single command.

The code information for each function may include a plurality of code informations corresponding to a plurality of functions. The table 1300 may indicate some of the code information for each function. Referring to the table 1300, the code information for each function may be related to the indoor unit 100-2.

Specifically, the code information for each function may include various functions such as an identification information transmission function 1301, a power on function 1302, a power off function 1303, a temperature up function 1304, a temperature down function 1305, a current temperature information request function 1306, a set temperature request function 1307, etc. Also, the code information for each function may include ID information, length information, data information, etc. corresponding to each function.

Meanwhile, the electronic apparatus 100 may store complex command information corresponding to the code information for each function. The complex command information may be information that grouped single commands disclosed in the code information for each function.

The table 1310 may indicate some of the complex command information. Referring to the table 1310, the identification information transmission function 1301 and the power on function 1302 may be grouped as one complex command 1311. Also, the identification information transmission function 1301 and the power off function 1303 may be grouped as one complex command 1312. In addition, the complex command information may group three single commands. For example, the identification information transmission function 1301, the current temperature information request function 1306, and the set temperature request function 1307 may be grouped as one complex command 1315.

Meanwhile, all functions are not grouped in the code information for each function, and the temperature up function and the temperature down function may be processed as single commands in the same manner as the temperature up function 1304 and the temperature down function 1305 of the code information for each function.

Meanwhile, the complex command information disclosed in FIG. 13 uses the previous code information for each function as it is, and it may be information generated by performing a grouping operation based on predefined functions.

FIG. 14 is a diagram for illustrating complex command information according to an embodiment of the disclosure.

Referring to FIG. 14, the electronic apparatus 100 may store complex command information according to an embodiment different from FIG. 13. Also, the table 1410 is a table for indicating complex command information according to another embodiment of the disclosure.

As the table 1300 and the plurality of functions 1301 to 1307 in FIG. 14 were described in FIG. 13, overlapping descriptions will be omitted.

Also, functional explanation for the various complex commands 1411, 1412, 1415 in the table 1410 in FIG. 14 may correspond to the complex commands 1311, 1312, 1315 in FIG. 13.

In the complex command 1411, the identification information transmission function 1301 and the power on function 1302 may have been grouped. Here, the complex command 1411 may convert the code information of the identification information transmission function 1301 and the code information of the power on function 1302 into one code information. For example, if the ID of the identification information transmission function 1301 is "30" and the ID of the power on function 1302 is "00," the ID of the complex command 1411 may be "30 00." The complex command 1411 may combine the previous ID informations and generate one ID information.

The complex command 1412 and the complex command 1415 may also combine the previous code informations for each function as the complex command 1411 and include new code information. Here, the new code information may be information that simply combined the previous code informations, and it may not be information that changed the previous code informations to a totally new code.

FIG. 15 is a diagram for illustrating complex command information according to still an embodiment of the disclosure.

As the table 1300 and the plurality of functions 1301 to 1307 in FIG. 15 were described in FIG. 13, overlapping descriptions will be omitted.

Also, functional explanation for the various complex commands 1511, 1512, 1515 in the table 1510 in FIG. 15 may correspond to the complex commands 1311, 1312, 1315 in FIG. 13.

In the complex command 1511, the identification information transmission function 1301 and the power on function 1302 may have been grouped. Here, the complex command 1511 may substitute the code information of the identification information transmission function 1301 and the code information of the power on function 1302 with separate code informations. For example, if the ID of the identification information transmission function 1301 is "30" and the ID of the power on function 1302 is "00," the ID of the complex command 1511 may be "AA 01." The code information of the complex command 1511 may be substituted with separate code information that is totally different from the previous code information of the single command, and the electronic apparatus 100 may store mapping information between the previous code information and the newly generated code information. That is, if the electronic apparatus 100 receives an ID "AA 01," the electronic apparatus 100 may identify that "AA 01" is the ID of "30" and "00" based on the mapping information.

Figure 16:
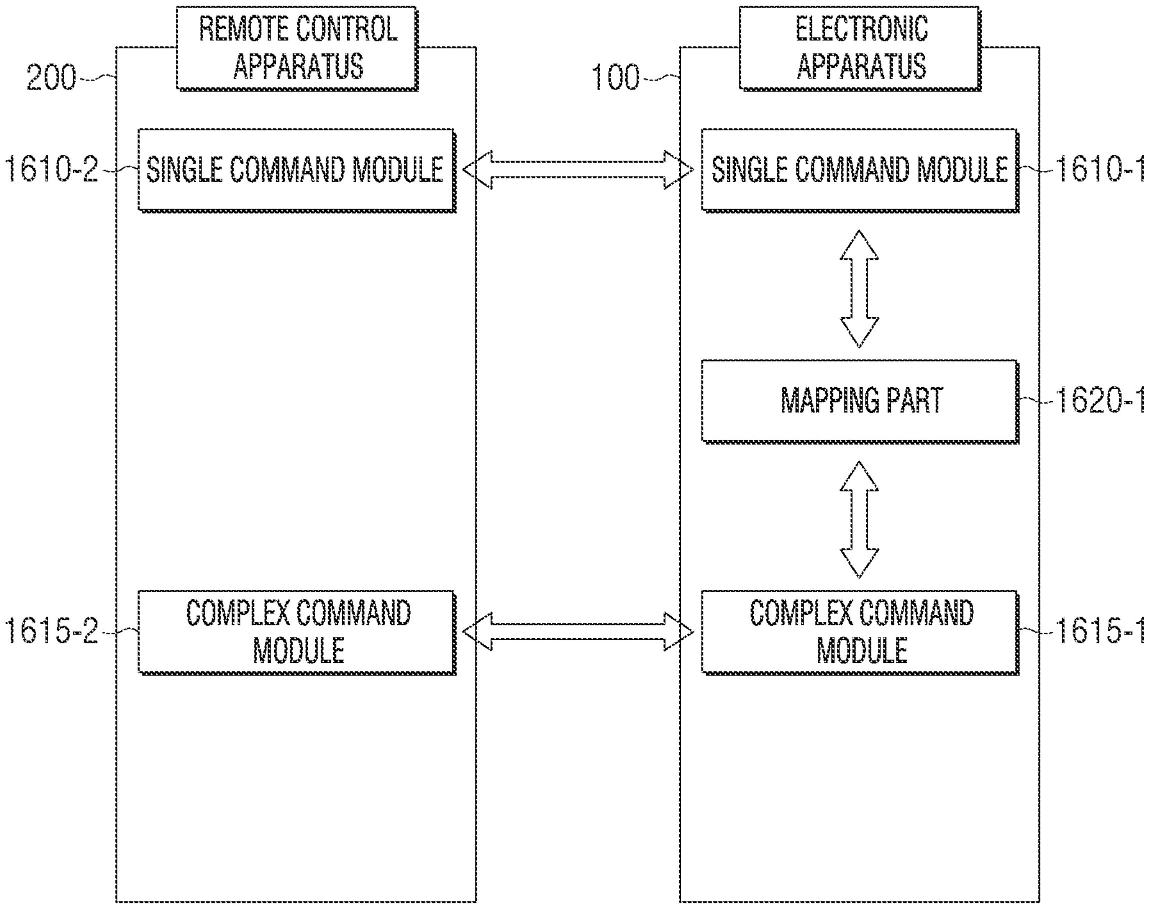
FIG. 16 is a diagram for illustrating an operation of processing a single control signal and complex control signals according to an embodiment of the disclosure.

FIG. 16 is a diagram for illustrating an operation of processing a single command and a complex command according to an embodiment of the disclosure.

Referring to FIG. 16, the electronic apparatus 100 may include a single command module 1610-1, a complex command module 1615-1, and a mapping part 1620-1.

Also, the remote control apparatus 200 may include a single command module 1610-2 and a complex command module 1615-2.

The single command module 1610-1 of the electronic apparatus 100 and the single command module 1610-2 of the remote control apparatus 200 may mean modules processing the code information for each function in FIG. 13. That is, the single command module 1610-1 of the electronic apparatus 100 and the single command module 1610-2 of the remote control apparatus 200 may mean modules communicating by using the code information for each function. Detailed explanation related to a single command module will be made in FIG. 17 below.

The complex command module 1615-1 of the electronic apparatus 100 and the complex command module 1615-2 of the remote control apparatus 200 may mean modules processing complex command information. That is, the complex command module 1615-1 of the electronic apparatus 100 and the complex command module 1615-2 of the remote control apparatus 200 may mean modules communicating by using the code information for each function. Also, the mapping part 1620-1 stores the complex command information, and may change a complex control signal received from the complex command module 1615-1 to a single command Detailed explanation related to a complex command module will be made in FIG. 18 below.

Figure 17:
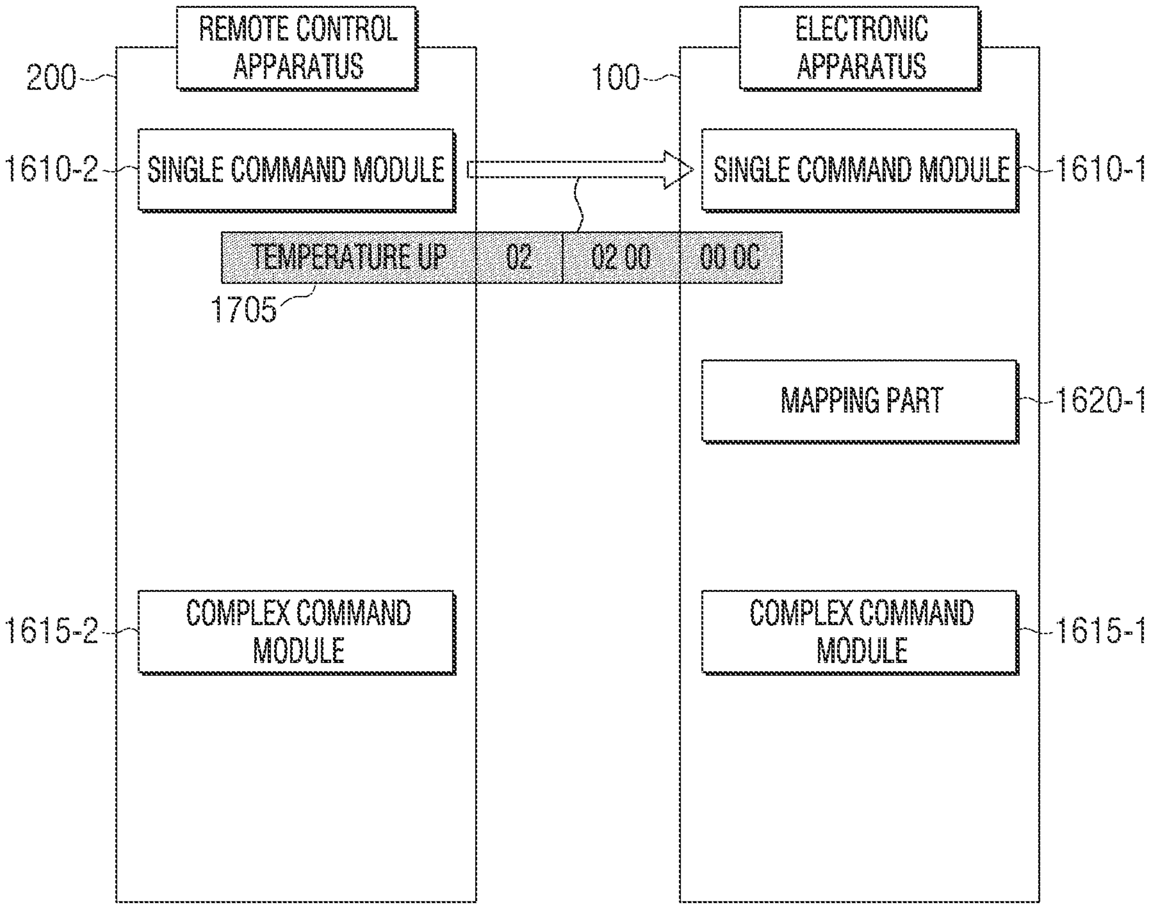
FIG. 17 is a diagram for illustrating an operation of processing a basic command.

FIG. 17 is a diagram for illustrating an operation of processing a basic command according to an embodiment of the disclosure.

Referring to FIG. 17, the single command module 1610-2 of the remote control apparatus 200 may generate a single command control signal 1705 in response to a user input, and transmit the generated single command control signal 1705 to the single command module 1610-1 of the electronic apparatus 100. Then, the single command module 1610-1 of the electronic apparatus 100 may receive the single command control signal 1705 from the single command module 1610-2 of the remote control apparatus 200. Then, the electronic apparatus 100 may acquire function information included in the received single command control signal 1705, and perform a control operation (the temperature up function) corresponding to the acquired function information.

Figure 18:
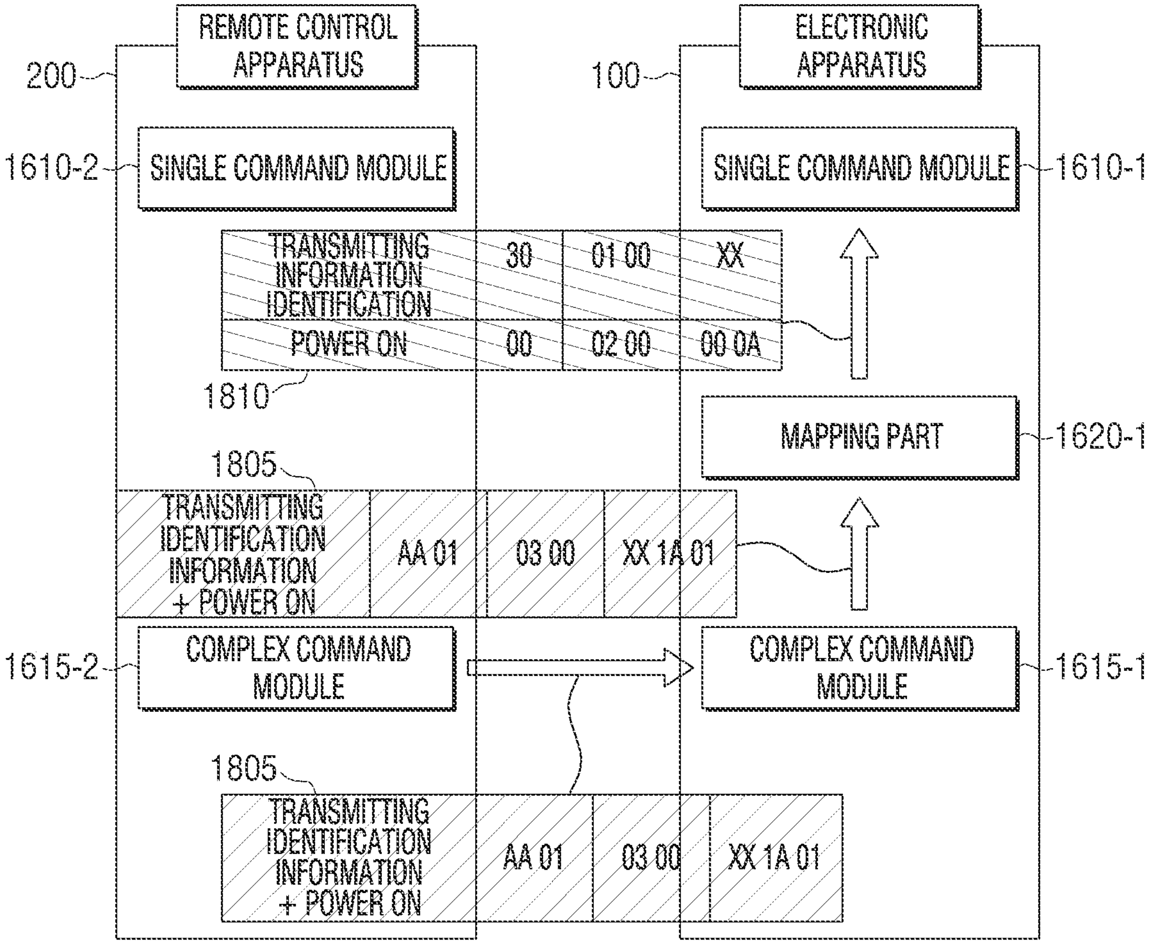
FIG. 18 is a diagram for illustrating an operation of processing a complex command according to an embodiment of the disclosure.

FIG. 18 is a diagram for illustrating an operation of processing a complex command according to an embodiment of the disclosure.

Referring to FIG. 18, the complex command module 1615-2 of the remote control apparatus 200 may generate a complex control signal 1805, and transmit the generated complex control signal 1805 to the electronic apparatus 100. Then, the complex command module 1615-1 of the electronic apparatus 100 may transmit the complex control signal 1805 received from the remote control apparatus 200 to the mapping part 1620-1 of the electronic apparatus 100. Then, the mapping part 1620-1 of the electronic apparatus 100 may change (or convert) the received complex control signal 1805 to a plurality of single command informations 1810 based on the complex command information. Then, the mapping part 1620-1 of the electronic apparatus 100 may transmit the plurality of changed (or converted) single command informations 1810 to the single command module 1610-1 of the electronic apparatus 100. Here, the single command module 1610-1 of the electronic apparatus 100 may receive the plurality of single command informations 1810, and perform control operations (the identification information transmission function and the power on function) corresponding to the plurality of received signal command informations 1810.

Figure 19:
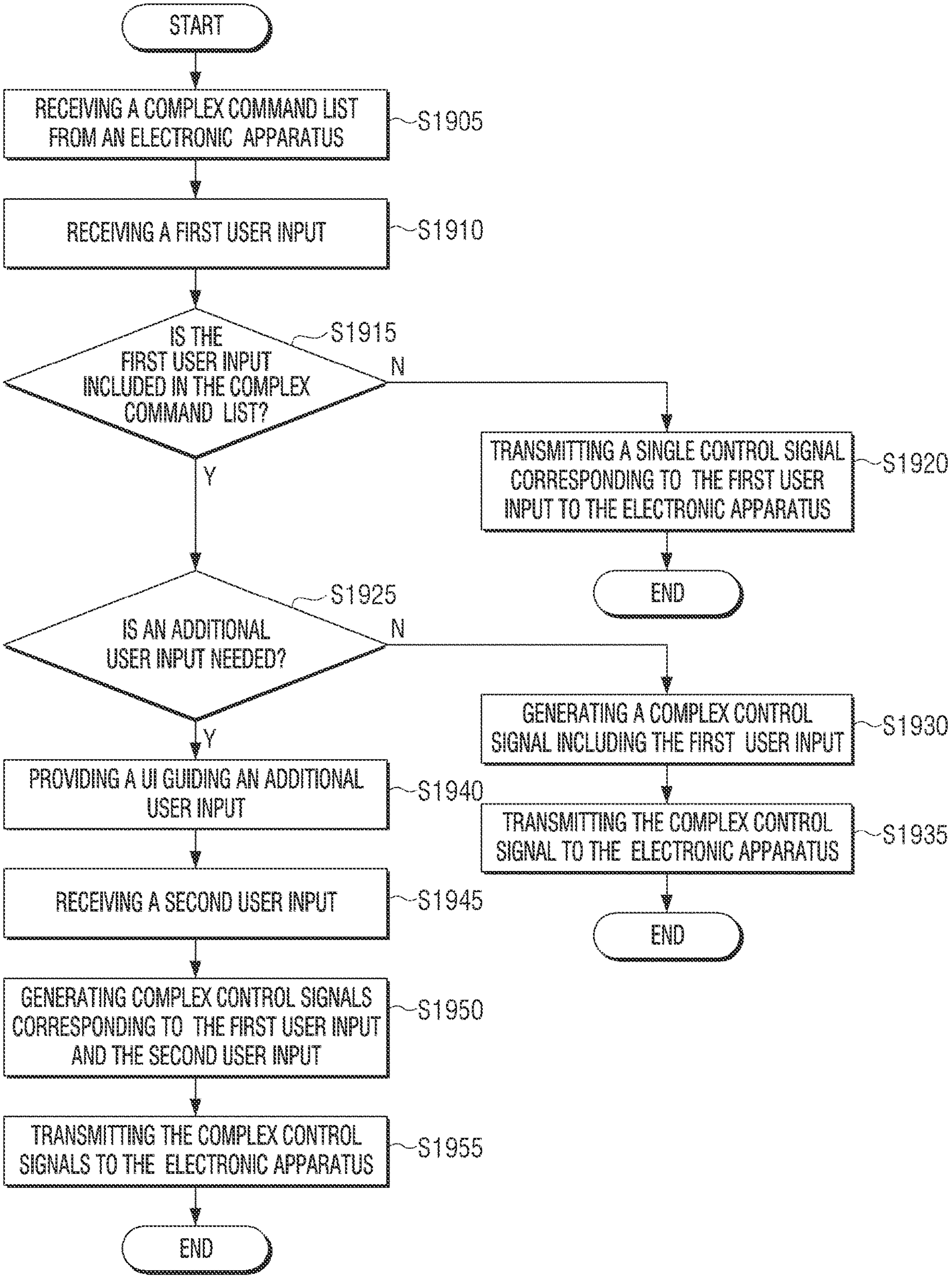
FIG. 19 is a flow chart for illustrating an operation of a remote control apparatus to a complex command according to an embodiment of the disclosure.

FIG. 19 is a flow chart for illustrating an operation of a remote control apparatus to a complex command according to an embodiment of the disclosure.

Referring to FIG. 19, the remote control apparatus 200 may receive a complex command list from the electronic apparatus 100 at operation S1905. Here, the remote control apparatus 200 may receive a first user input at operation S1910. Here, the remote control apparatus 200 may determine whether the first user input is included in the complex command list at operation S1915.

If the first user input is not included in the complex command list, the remote control apparatus 200 may determine the first user input as a single command. Then, the remote control apparatus 200 may transmit a single control signal corresponding to the first user input to the electronic apparatus 100 at operation S1920.

Meanwhile, if the first user input is included in the complex command list, the remote control apparatus 200 may determine whether an additional user input is needed other than the first user input at operation S1925. A complex command may mean a command that grouped a plurality of single commands, and a plurality of user inputs may be needed. Accordingly, if a single command corresponding to the first user input is grouped with a single command corresponding to a second user input, the remote control apparatus 200 may need the second user input.

If an additional user input is not needed at the operation S1925, the remote control apparatus 200 may generate a complex control signal including the first user input at operation S1930. Here, it will be assumed that the first user input corresponds to one single command (a first single command), and the first single command is grouped with a second single command. The remote control apparatus 200 may generate a complex command signal based on the first single command and the second single command Here, the remote control apparatus 200 may transmit the generated complex control signal to the electronic apparatus 100 at operation S1935.

In case an additional user input is needed at the operation S1925, the remote control apparatus 200 may provide a UI guiding an additional user input at operation S1940. In case the remote control apparatus 200 includes a display, a graphic UI may be displayed on the display. Also, in case the remote control apparatus 200 includes a speaker, a sound UI may be output through the speaker. Then, the remote control apparatus 200 may receive a second user input at operation S1945. Here, the remote control apparatus 200 may generate a complex control signal corresponding to the first user input and the second user input at operation S1950. Here, the remote control apparatus 200 may transmit the generated complex control signal to the electronic apparatus 100 at operation S1955.

The embodiment of FIG. 19 discloses a feature that a received user input is a complex command and guides an additional user input. As a complex command groups a plurality of single commands, in case a user input is additionally needed, the information may be guided to a user.

Figure 20:
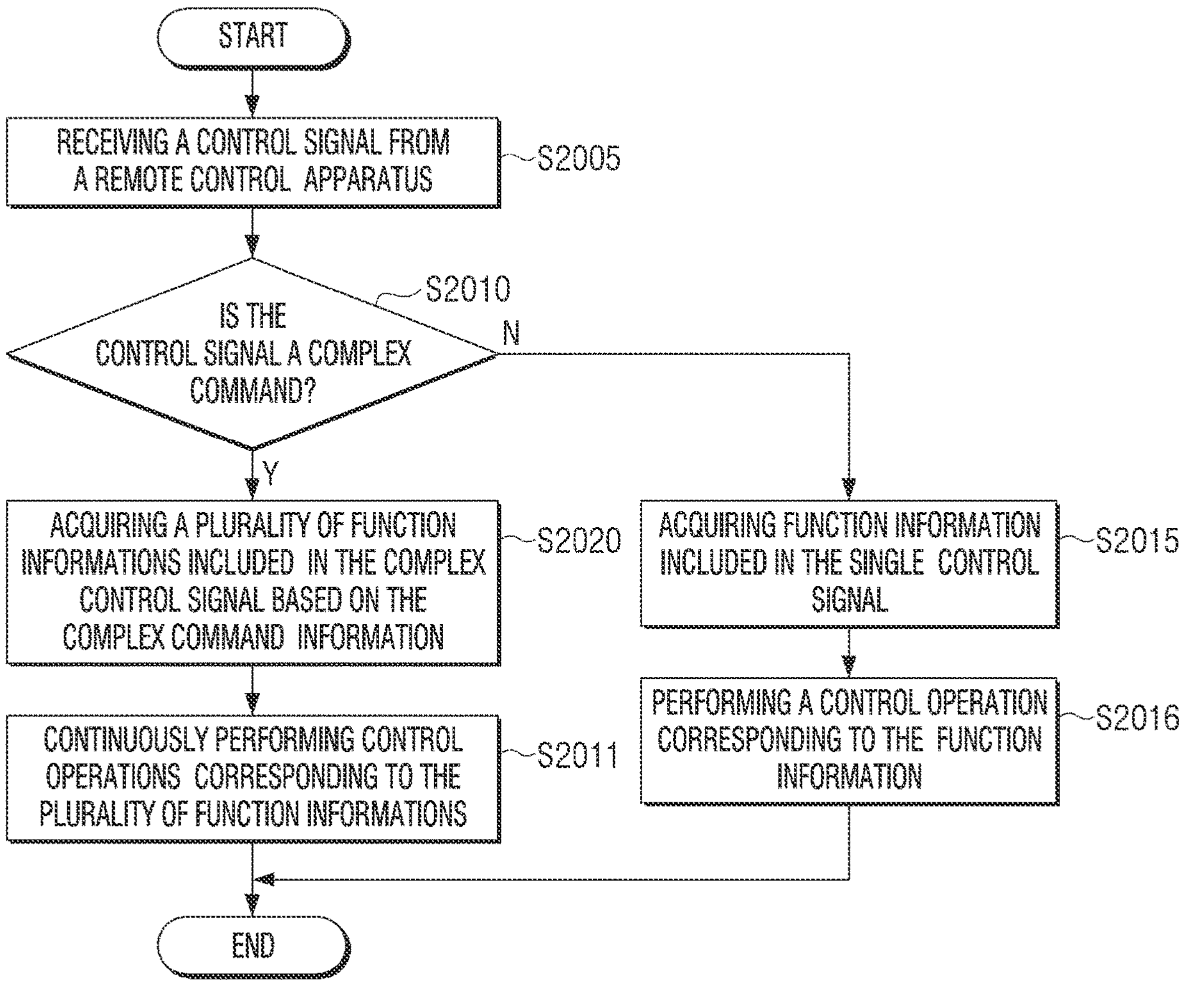
FIG. 20 is a flow chart for illustrating an operation of an electronic apparatus to a complex command according to an embodiment of the disclosure.

FIG. 20 is a flow chart for illustrating an operation of an electronic apparatus to a complex command according to an embodiment of the disclosure.

Referring to FIG. 20, the electronic apparatus 100 may receive a control signal from the remote control apparatus 200 at operation S2005. Here, the electronic apparatus 100 may determine whether the received control signal is a complex command at operation S2010. Here, in an embodiment of determining a complex command, it may be determined whether function information included in a control signal is included in the complex command information. For example, if a function included in a control signal is included in the complex command information, the electronic apparatus 100 may determine that the control signal is a complex control signal. In another embodiment of determining a complex command, it may be determined whether information that the signal is a complex command control signal is included in a transmitted control signal. For example, the remote control apparatus 200 may include information indicating that the signal is a complex control signal in a complex control signal when generating the complex control signal. Accordingly, in case a control signal includes information that the signal is a complex control signal, the processor 130 may determine that the control signal is a complex control signal.

If a received control signal is not a complex command, the electronic apparatus 100 may determine that the received control signal falls under a single command. Then, the electronic apparatus 100 may determine that the received control signal is a single control signal. Here, the electronic apparatus 100 may acquire function information corresponding to the single control signal at operation S2015. Here, the electronic apparatus 100 may perform a control operation corresponding to the acquired function information at operation S2016.

If a received control signal is a complex command, the electronic apparatus 100 may determine that the received control signal is a complex control signal. Here, the electronic apparatus 100 may acquire a plurality of function informations included in the complex control signal based on the complex command information at operation S2011. Here, the electronic apparatus 100 may continuously perform control operations corresponding to the plurality of acquired function informations at operation S2021.

FIG. 21 is a diagram for illustrating types of a basic command according to an embodiment of the disclosure.

Referring to FIG. 21, a plurality of single functions or single commands may include type information. Here, the type information may be information indicating what kinds of operations are performed by single commands. Specifically, the type information may mean at least one operation among a read operation and a write operation.

The table 2105 may include type information of single commands. Specifically, functions 2110 corresponding to the first type may be read operations. For example, read operations may be operations such as return of the current temperature, return of the current humidity, return of the set temperature, return of the set mode, etc.

Meanwhile, the functions 2115 corresponding to the second type may be write operations. For example, read operations may be operations such as setting of a cooling mode, setting of a dehumidification mode, down setting of a temperature, up setting of a temperature, etc.

Figure 22:
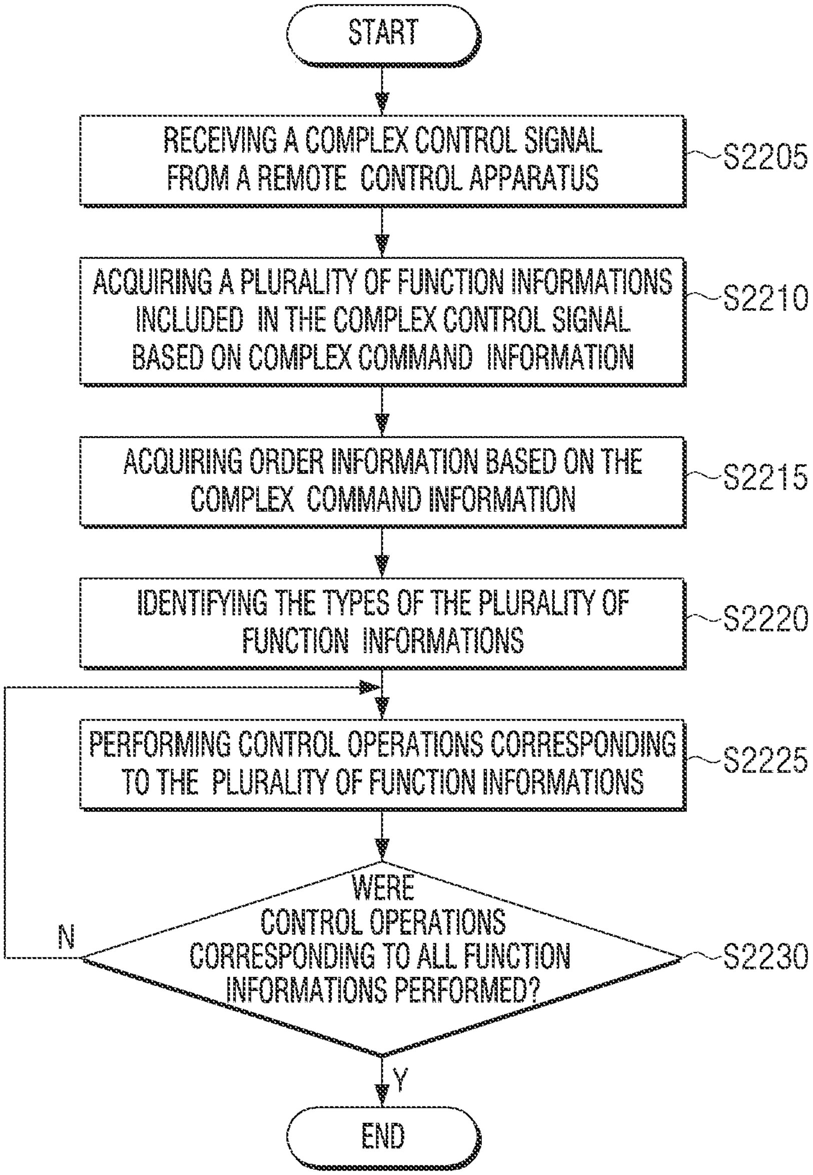
FIG. 22 is a diagram for illustrating an embodiment of performing a plurality of basic commands to an order according to an embodiment of the disclosure.

FIG. 22 is a diagram for illustrating an embodiment of performing a plurality of basic commands to an order according to an embodiment of the disclosure.

Referring to FIG. 22, the electronic apparatus 100 may receive a complex control signal from the remote control apparatus 200 at operation S2205. Here, the electronic apparatus 100 may acquire a plurality of function informations included in the complex control signal based on the complex command information at operation S2210. Here, the electronic apparatus 100 may identify the order of the plurality of function informations (the order corresponding to the plurality of single commands) at operation S2215. Specifically, a complex command may include a plurality of single commands, and an order may be determined among the single commands.

Here, the electronic apparatus 100 may identify the types of the plurality of function informations (or single commands) at operation S2220. The types may include at least one of a read operation or a write operation. The plurality of function informations (or single commands) may be the same type. Accordingly, if the electronic apparatus 100 identifies the type of one function information (or single command) through the operation S2220, the electronic apparatus 100 may not identify the types of the function informations (or single commands) afterwards. The electronic apparatus 100 may perform a control operation corresponding to the first function information (or single command) based on the identified type and the order information of the function informations (or single commands) at operation S2225.

Here, the electronic apparatus 100 may determine whether a control operation corresponding to a function information (or single command) among the acquired function informations (or single commands) was performed at operation S2230. In case control operations corresponding to all function informations (or single commands) were not performed, the electronic apparatus 100 may perform a control operation corresponding to a single command in the next order.

Meanwhile, the types of single commands included in a complex command may be different from one another. An embodiment in this regard will be described in FIG. 23 below.

Figure 23:
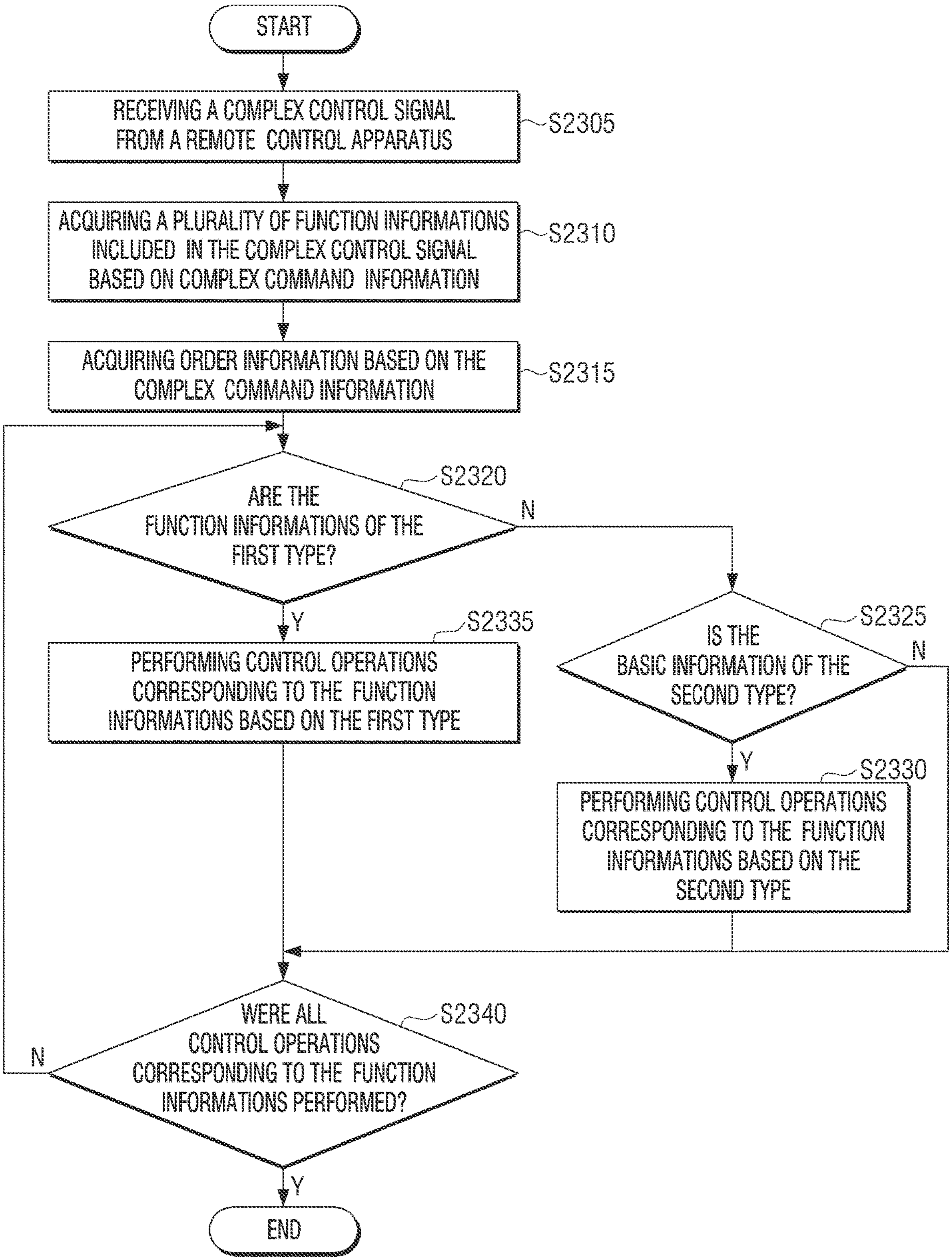
FIG. 23 is a diagram for illustrating an embodiment of performing a plurality of basic commands to an order according to an embodiment of the disclosure.

FIG. 23 is a diagram for illustrating another embodiment of performing a plurality of basic commands to an order according to an embodiment of the disclosure.

Referring to FIG. 23, the electronic apparatus 100 may receive a complex control signal from the remote control apparatus 200 at operation S2305. Here, the electronic apparatus 100 may acquire a plurality of function informations corresponding to the complex command based on the complex command information at operation S2310. Here, the electronic apparatus 100 may identify the order of the plurality of function informations (or single commands) at operation S2315.

The electronic apparatus 100 may identify the function information in the first order (the first function information) among the plurality of single commands. Then, the electronic apparatus 100 may identify whether the first function information is the first type at operation S2320. Here, the first type may mean a read operation.

If the first function information is not the first type, the electronic apparatus 100 may identify whether the first function information is a second type at operation S2325. Here, the second type may be a write operation. Here, if the first function information is the second type, the electronic apparatus 100 may perform a control operation corresponding to the function information (the first function information) based on the second type at operation S2330.

If the first function information is the first type, the electronic apparatus 100 may perform a control operation corresponding to the function information (the first function information) based on the first type at operation S2335.

Here, the electronic apparatus 100 may determine whether all control operations corresponding to the plurality of function informations acquired at the operation S2310 were performed at operation S2340. If control operations corresponding to all function informations were not performed, the electronic apparatus 100 may perform the operation S2320 for the function information in the next order (the second function information).

Figure 24:
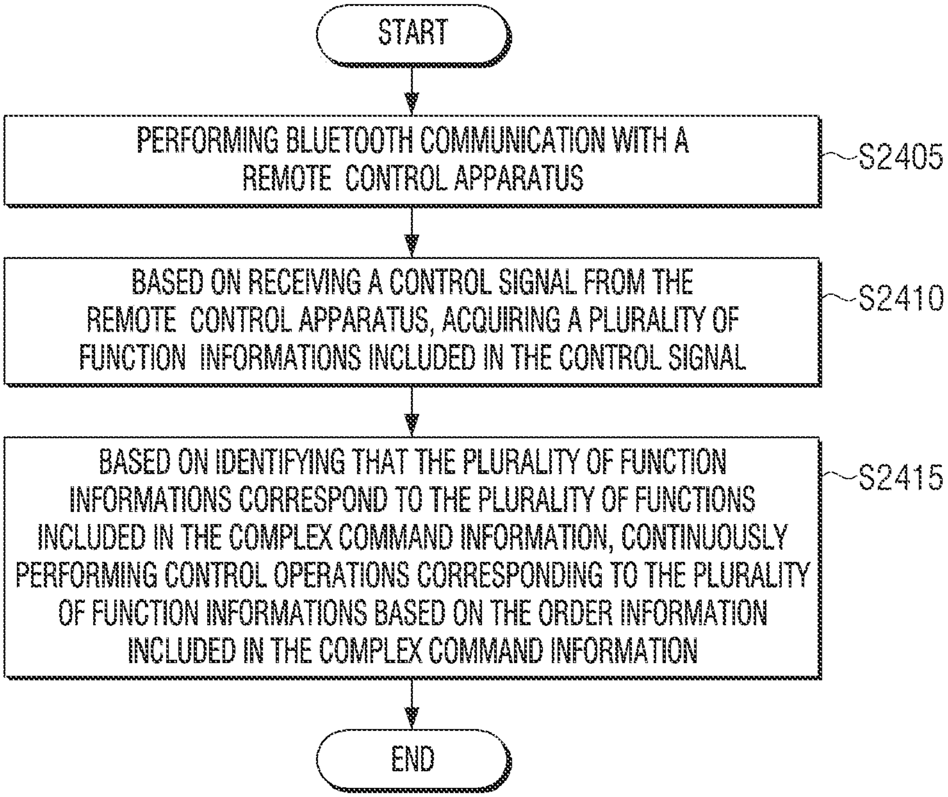
FIG. 24 is a flow chart for illustrating a controlling method of an electronic apparatus according to an embodiment of the disclosure.

FIG. 24 is a flow chart for illustrating a controlling method of an electronic apparatus according to an embodiment of the disclosure.

Referring to FIG. 24, in a controlling method of the electronic apparatus 100 storing complex command information including a plurality of functions and the order information of the plurality of functions, the electronic apparatus 100 may perform Bluetooth communication with the remote control apparatus 200 at operation S2405. Also, the electronic apparatus 100 may acquire a plurality of function informations included in a control signal when a control signal is received from the remote control apparatus 200 at operation S2410. In addition, if it is identified that the plurality of function informations correspond to the plurality of functions included in the complex command information, the electronic apparatus 100 may continuously perform control operations corresponding to the plurality of function informations based on the order information included in the complex command information at operation S2415.

Meanwhile, the plurality of function informations may include first code information corresponding to a first function executable in the electronic apparatus 100 and second code information corresponding to a second function executable in the electronic apparatus 100, and at the operation S2415 of continuously performing control operations, control operations corresponding to the first code information and the second code information may be continuously performed based on the order information of the first function and the second function included in the complex command information.

Meanwhile, the plurality of functions included in the complex command information may include a plurality of functions of the same type, and the plurality of functions of the same type may be a plurality of functions performed by a read operation of data or a plurality of functions performed by a write operation of data.

Meanwhile, the remote control apparatus 200 may include a first remote control apparatus 201 and a second remote control apparatus 202, and at the operation S2415 of continuously performing control operations, if a first control signal received from the first remote control apparatus 201 corresponds to the first complex command information and a second control signal received from the second remote control apparatus 202 corresponds to the second complex command information, control operations corresponding to the plurality of function informations included in any one of the first control signal or the second control signal may be continuously performed.

Meanwhile, the remote control apparatus 200 may include a first remote control apparatus 201 and a second remote control apparatus 202, and at the operation S2415 of continuously performing control operations, if a first control signal received from the first remote control apparatus 201 corresponds to the first complex command information and a second control signal received from the second remote control apparatus 202 corresponds to the single command information, control operations corresponding to the plurality of function informations included in the first control signal may be continuously performed, and control operations corresponding to the second control signal may be continuously performed.

Meanwhile, a control signal may include a function of requesting return information to the remote control apparatus 200, and the controlling method may further include the operations of, if the electronic apparatus 100 is in a state of being connected with the remote control apparatus 200 via Bluetooth communication through the communication interface 120, transmitting the return information to the remote control apparatus 200, and if the electronic apparatus 100 is not in a state of being connected with the remote control apparatus 200 via Bluetooth communication through the communication interface 120, performing Bluetooth communication connection with another remote control apparatus, and transmitting the return information to the another remote control apparatus.

Here, in the operation of transmitting the return information to the another remote control apparatus, if the electronic apparatus 100 is not in a state of being connected with the remote control apparatus 200 via Bluetooth communication through the communication interface 120, a control signal including the return information and identification information of the remote control apparatus 200 may be transmitted to the another remote control apparatus, and the control signal transmitted to the another remote control apparatus may be a signal that controls to transmit the return information to the remote control apparatus 200 based on the identification information of the remote control apparatus 200.

Meanwhile, the complex command information may be information that sequentially mapped control codes corresponding to each of the plurality of functions based on the order information.

Meanwhile, the controlling method may further include the operations of identifying whether the remote control apparatus 200 has a history of Bluetooth communication connection with the electronic apparatus 100, and if it is identified that the remote control apparatus 200 does not have the history of Bluetooth communication connection with the electronic apparatus 100, transmitting the complex command information to the remote control apparatus 200.

Meanwhile, in the controlling method, if it is identified that a plurality of remote control apparatuses 200 including the remote control apparatus 200 are connected via Bluetooth communication through the communication interface 120, a request signal making the control signal transmitted based on the complex command information may be transmitted to the remote control apparatus 200.

Meanwhile, the controlling method of an electronic apparatus as in FIG. 24 may be executed on an electronic apparatus having the configuration as in FIG. 1 to FIG. 3, and it may also be executed on electronic apparatuses having different configurations.

Meanwhile, methods according to the aforementioned various embodiments of the disclosure may be implemented in forms of applications that can be installed on an electronic apparatuses.

Also, methods according to the aforementioned various embodiments of the disclosure may be implemented only by software/hardware upgrade of an electronic apparatuses.

In addition, the aforementioned various embodiments of the disclosure may be performed through an embedded server provided on an electronic apparatus, or an external server of at least one of an electronic apparatus or a display apparatus.

Meanwhile, according to an embodiment of the disclosure, the aforementioned various embodiments of the disclosure may be implemented as software including instructions stored in a storage medium (a machine-readable storage medium) that is readable by machines (e.g.: computers). The machines refer to apparatuses that call instructions stored in a storage medium, and can operate according to the called instructions, and the apparatuses may include an electronic apparatus according to the aforementioned embodiments. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment of the disclosure, methods according to the aforementioned various embodiments of the disclosure may be provided while being included in a computer program product. A computer program product refers to a product, and it can be traded between a seller and a buyer. A computer program product can be distributed on-line in the form of a storage medium that is readable by machines (e.g.: a compact disc read only memory (CD-ROM)), or through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

In addition, each of the components according to the aforementioned various embodiments (e.g.: a module or a program) may include a singular object or a plurality of objects. Also, among the aforementioned corresponding sub components, some sub components may be omitted, or other sub components may be further included in the various embodiments. Generally or additionally, some components (e.g.: a module or a program) may be integrated as an object, and perform the functions that were performed by each of the components before integration identically or in a similar manner A module, a program, or operations performed by other components according to the various embodiments may be executed sequentially, in parallel, repetitively, or heuristically. Or, at least some of the operations may be executed in a different order or omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:

a memory storing complex command information including a complex command comprising a plurality of functions and order information including an order in which to perform each function of the plurality of functions associated with the complex command;

a communication circuitry; and a processor configured to:

control the communication circuitry to perform Bluetooth communication with a remote control apparatus, based on a control signal being received from the remote control apparatus, acquire a plurality of function information included in the control signal, based on identifying that the plurality of function information correspond to the plurality of functions included in the complex command information, identify an order of the plurality of function information based on the order information included in the complex command information, and perform control operations corresponding to the plurality of function information continuously based on the order of the plurality of function information, wherein the plurality of functions included in the complex command information comprise:

a plurality of functions of a same type, wherein the plurality of functions of the same type are a plurality of functions performed by a read operation of data or a plurality of functions performed by a write operation of data, wherein the read operation includes at least one operation of return of current temperature, return of current humidity, return of set temperature, or return of set mode, wherein the write operation includes at least one operation of setting of a cooling mode, setting of a dehumidification mode, down setting of a temperature, or up setting of a temperature, wherein the control signal comprises:

a function of requesting return information to the remote control apparatus, wherein the processor is further configured to:

based on being connected with the remote control apparatus via Bluetooth communication through the communication circuitry, transmit the return information to the remote control apparatus, and based on not being connected with the remote control apparatus via Bluetooth communication through the communication circuitry, perform Bluetooth communication connection with another remote control apparatus, and transmit a control signal including the return information and identification information of the remote control apparatus to the another remote control apparatus, and wherein the transmitted control signal transmitted to the another remote control apparatus is a signal that controls to transmit the return information to the remote control apparatus based on the identification information of the remote control apparatus.

2. The electronic apparatus of claim 1, wherein the plurality of function information comprise:

first code information corresponding to a first function executable in the electronic apparatus and second code information corresponding to a second function executable in the electronic apparatus, and wherein the processor is further configured to:

identify an order of the first function and the second function based on the order information included in the complex command information, and perform control operations corresponding to the first code information and the second code information continuously based on the order of the first function and the second function included in the complex command information.

3. The electronic apparatus of claim 1, wherein the remote control apparatus comprises:

a first remote control apparatus and a second remote control apparatus, and wherein the processor is further configured to:

based on a first control signal received from the first remote control apparatus corresponding to first complex command information and a second control signal received from the second remote control apparatus corresponding to second complex command information, perform control operations corresponding to a plurality of function information included in any one of the first control signal or the second control signal continuously.

4. The electronic apparatus of claim 1,
wherein the remote control apparatus comprises:
a first remote control apparatus and a second remote control apparatus, and
wherein the processor is further configured to:
based on a first control signal received from the first remote control apparatus corresponding to first complex command information and a second control signal received from the second remote control apparatus corresponding to single command information, perform control operations corresponding to a plurality of function information included in the first control signal continuously and perform control operations corresponding to the second control signal.

5. The electronic apparatus of claim 1, wherein the complex command information is information that sequentially mapped control codes corresponding to each of the plurality of functions based on the order.

6. The electronic apparatus of claim 1, wherein the processor is further configured to:
identify whether the remote control apparatus has a history of Bluetooth communication connection with the electronic apparatus, and
based on the remote control apparatus not having the history of Bluetooth communication connection with the electronic apparatus, control the communication circuitry to transmit the complex command information to the remote control apparatus.

7. The electronic apparatus of claim 1, wherein the processor is further configured to:
based on identifying that a plurality of remote control apparatuses including the remote control apparatus are connected via Bluetooth communication through the communication circuitry, transmit a request signal making the control signal based on the complex command information to the remote control apparatus.

8. A controlling method of an electronic apparatus storing complex command information including a complex command comprising a plurality of functions and order information including an order in which to perform each function of the plurality of functions associated with the complex command, the method comprising:
performing Bluetooth communication with a remote control apparatus;
based on a control signal being received from the remote control apparatus, acquiring a plurality of function information included in the control signal;
based on identifying that the plurality of function information correspond to the plurality of functions included in the complex command information, identifying an order of the plurality of function information based on the order information included in the complex command information; and
performing control operations corresponding to the plurality of function information continuously based on the order of the plurality of function information,
wherein the plurality of functions included in the complex command information comprise:
a plurality of functions of a same type,
wherein the plurality of functions of the same type are a plurality of functions performed by a read operation of data or a plurality of functions performed by a write operation of data,
wherein the read operation includes at least one operation of return of current temperature, return of current humidity, return of set temperature, or return of set mode,
wherein the write operation includes at least one operation of setting of a cooling mode, setting of a dehumidification mode, down setting of a temperature, or up setting of a temperature,
wherein the control signal comprises:
a function of requesting return information to the remote control apparatus,
wherein the controlling method further comprises:
based on being connected with the remote control apparatus via Bluetooth communication through a communication circuitry, transmitting the return information to the remote control apparatus; and
based on not being connected with the remote control apparatus via Bluetooth communication through the communication circuitry, performing Bluetooth communication connection with another remote control apparatus, and transmitting a control signal including the return information and identification information of the remote control apparatus to the another remote control apparatus, and
wherein the transmitted control signal transmitted to the another remote control apparatus is a signal that controls to transmit the return information to the remote control apparatus based on the identification information of the remote control apparatus.

9. The controlling method of claim 8,
wherein the plurality of function information comprise:
first code information corresponding to a first function executable in the electronic apparatus and second code information corresponding to a second function executable in the electronic apparatus, and
wherein the performing of the control operations continuously comprises:
identifying an order of the first function and the second function based on the order information included in the complex command information; and
performing control operations corresponding to the first code information and the second code information continuously based on the order of the first function and the second function included in the complex command information.

10. The controlling method of claim 8,
wherein the remote control apparatus comprises:
a first remote control apparatus and a second remote control apparatus, and
wherein the performing of the control operations continuously comprises:
based on a first control signal received from the first remote control apparatus corresponding to first complex command information and a second control signal received from the second remote control apparatus corresponding to second complex command information, performing control operations corresponding to a plurality of function information included in any one of the first control signal or the second control signal continuously.

11. The controlling method of claim 8,
wherein the remote control apparatus comprises:
a first remote control apparatus and a second remote control apparatus, and
wherein the performing of the control operations continuously comprises:

based on a first control signal received from the first remote control apparatus corresponding to first complex command information and a second control signal received from the second remote control apparatus corresponding to single command information, performing control operations corresponding to a plurality of function information included in the first control signal continuously and performing control operations corresponding to the second control signal continuously.

12. The controlling method of claim 8, wherein the complex command information is information that sequentially mapped control codes corresponding to each of the plurality of functions based on the order.

13. The controlling method of claim 8, further comprising:

identifying whether the remote control apparatus has a history of Bluetooth communication connection with the electronic apparatus; and based on the remote control apparatus not having the history of Bluetooth communication connection with the electronic apparatus, transmitting the complex command information to the remote control apparatus.

14. The controlling method of claim 8, further comprising:

based on identifying that a plurality of remote control apparatuses including the remote control apparatus are connected via Bluetooth communication through a communication circuitry, transmitting a request signal making the control signal based on the complex command information to the remote control apparatus.

* * * * *